United States Patent
Kihara et al.

(10) Patent No.: US 8,415,930 B2
(45) Date of Patent: Apr. 9, 2013

(54) POWER SUPPLY DEVICE

(75) Inventors: Nobuhiro Kihara, Chiyoda-ku (JP); Masayoshi Maeda, Aioi (JP); Shinji Kawaguchi, Chiyoda-ku (JP); Hiroshi Okuda, Chiyoda-ku (JP); Fumito Uemura, Chiyoda-ku (JP); Takahiro Urakabe, Chiyoda-ku (JP); Masaya Inoue, Chiyoda-ku (JP); Naoki Itoi, Chiyoda-ku (JP); Kenji Ishi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 562 days.

(21) Appl. No.: 12/772,696

(22) Filed: May 3, 2010

(65) Prior Publication Data

US 2010/0289459 A1   Nov. 18, 2010

(30) Foreign Application Priority Data

May 13, 2009  (JP) ................................ 2009-116378
Dec. 8, 2009   (JP) ................................ 2009-278433

(51) Int. Cl.
*H02P 9/42* (2006.01)
(52) U.S. Cl. .......................................... 322/28; 322/24
(58) Field of Classification Search ................ 322/22, 322/24, 28, 29, 37
See application file for complete search history.

(56) References Cited

U.S. PATENT DOCUMENTS

| | | | | |
|---|---|---|---|---|
| 5,418,446 A | * | 5/1995 | Hallidy | 322/28 |
| 6,049,196 A | * | 4/2000 | Arai et al. | 322/61 |
| 7,075,271 B2 | * | 7/2006 | Urakabe et al. | 322/24 |
| 7,211,989 B2 | * | 5/2007 | Drubel et | 322/29 |

FOREIGN PATENT DOCUMENTS

| | | |
|---|---|---|
| JP | 59-222099 A | 12/1984 |
| JP | 2001-103796 A | 4/2001 |
| JP | 2004-299818 A | 10/2004 |
| JP | 2005-343438 A | 12/2005 |
| JP | 2007-151304 A | 6/2007 |
| JP | 4100793 B2 | 6/2008 |
| JP | 2008-263715 A | 10/2008 |

* cited by examiner

*Primary Examiner* — Nicholas Ponomarenko
(74) *Attorney, Agent, or Firm* — Sughrue Mion, PLLC

(57) ABSTRACT

Provided is a power supply device including: a magneto generator (1), which includes: a rotor including a magnet forming a magnetic field; and a stator which generates an alternating current in stator windings by rotation of the rotor; a rectifying unit (3) which rectifies the alternating current generated by the magneto generator to a direct current; a variable transformation-ratio direct current voltage transformer (40) which transforms an output voltage of the direct current of the rectifying unit to a voltage between input terminals of an electrical load (2) to which electric power is supplied; and a voltage control unit (5) which controls a transformation ratio of the variable transformation-ratio direct current voltage transformer in accordance with at least one of an operating state signal regarding the rotation of the rotor of the magneto generator and an electrical load state signal of the electrical load.

17 Claims, 26 Drawing Sheets ations of the power supply device by the magneto generator ac- current voltage transformer in accordance with at least one of

POWER SUPPLY DEVICE

BACKGROUND OF THE INVENTION

1. Field of the Invention

The present invention relates to a power supply device using a magneto generator.

2. Description of the Related Art

As a power supply device, there is conventionally known, for example, a power supply device using a magneto alternating current (AC) generator disclosed in JP 4100793 B. Such power supply device generally includes a magneto AC generator, a rectifier circuit, and a generated voltage control circuit. Electric power generated by the magneto AC generator is converted into a direct current (DC) by the rectifier circuit, and then input to the generated voltage control circuit. The generated voltage control circuit performs short-circuit control or opening control so as to obtain a voltage in accordance with, for example, a voltage of an electrical load such as an electrical storage device, and then the electric power is supplied to the electrical load.

In the conventional power supply device using the magneto AC generator, the generated voltage of a generator alone is controlled in accordance with the voltage of the electrical load. For this reason, the generator is required to generate power with a single generated voltage. Meanwhile, in the magneto AC generator, a generated voltage by which power generation efficiency becomes the maximum differs depending on rpm of a rotor. For this reason, the generator of the conventional power supply device does not necessarily generate power with the generated voltage by which the power generation efficiency becomes the maximum.

Further, in the generated voltage control circuit, electric power supply to the electrical load is controlled only in accordance with a state of the electrical load. However, for example, in a case of a motor, which includes a power supply device installed therein, a state of a torque supplying device (engine in a case of automobile) for a generator varies constantly. As a result, even in a case where the torque supplying device is operated with high load and low efficiency, power generation is performed only in accordance with the state of the electrical load, which is inefficient.

Meanwhile, the generated electric power of the magneto AC generator differs depending on the rpm of the rotor. For this reason, the magneto AC generator of the conventional power supply device does not necessarily perform continuous power generation necessary for the electrical load.

SUMMARY OF THE INVENTION

The present invention has been made to solve the problems described above, and therefore it is an object thereof to improve power generation efficiency of a power supply device using a magneto generator compared with a conventional one.

The present invention provides a power supply device including: a magneto generator, which includes: a rotor including a magnet forming a magnetic field; and a stator which generates an alternating current in stator windings by rotation of the rotor; a rectifying unit which rectifies the alternating current generated by the magneto generator to a direct current; a variable transformation-ratio direct current voltage transformer which transforms an output voltage of the direct current of the rectifying unit to a voltage between input terminals of an electrical load to which electric power is supplied; and a voltage control unit which controls a transformation ratio of the variable transformation-ratio direct an operating state signal regarding the rotation of the rotor of the magneto generator and an electrical load state signal of the electrical load.

According to the present invention, power generation efficiency of the power supply device using a magneto generator may be improved compared with that of the conventional power supply device.

The power supply device according to the present invention generates power with such a generated voltage that improves power generation efficiency compared with a conventional power supply device, and also transforms a voltage in accordance with a voltage of the electrical load by the DC voltage transformer, to thereby obtain an output current higher than that of the conventional power supply device.

Besides, in addition to controlling the generated voltage of the generator, the voltage is transformed in accordance with the voltage of the electrical load by the DC voltage transformer, and hence the generated current may also be controlled. Therefore, in a case where control is performed so that the generated current is suppressed, input torque (input energy) from the torque supplying device is suppressed, which enables a reduction in load of the torque supplying device. In this case, the control is performed using operating state (load state) information on the torque supplying device.

The generated voltage of the conventional generator depends on load characteristics, and hence the generated voltage is 14 V when the load is, for example, a battery having a terminal voltage of 14 V. In contrast, according to the present invention, the transformation ratio of the DC voltage transformer may be switched, and hence an input voltage to the DC voltage transformer, that is, the generated voltage of the generator may be set to an appropriate voltage. In other words, when the transformation ratio is switched, operation may be made with the generated voltage by which high output current is obtained or with the generated voltage by which the input torque (input energy) is reduced.

(1) The generated voltage is changed to control the magnitude of electric power by changing the transformation ratio of the DC voltage transformer. In a case where the load characteristics include a constant voltage of 14 V as in the case of a battery, an operation of the generator changes to output 14 V, 28 V, 42 V, or the like in accordance with the transformation ratio, and hence the output electric power and the input torque (input energy) change.

(2) Whether or not to supply the electric power is controlled by a thyristor (SCR) or the like of the rectifying unit. When the load is a battery, in order to prevent the battery from entering into an overcharged (overvoltage) state, whether or not to supply the electric power is controlled by the SCR or the like of the rectifying unit so that the battery voltage may fall within a certain range.

DETAILED DESCRIPTION OF THE PREFERRED EMBODIMENTS

Hereinafter, a power supply device according to the present invention is described by way of respective embodiments with reference to the accompanying drawings.

First Embodiment

Figure 1:
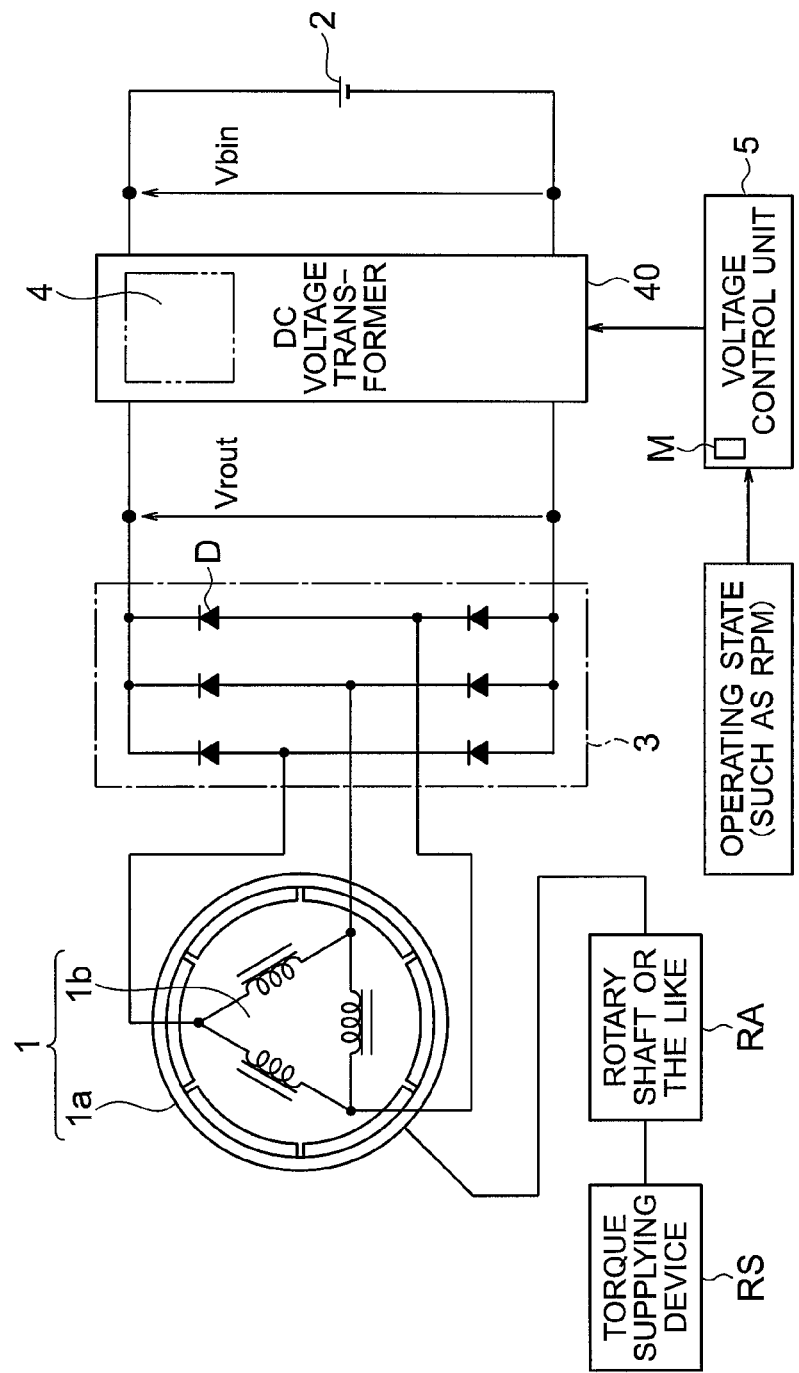
FIG. 1 is a diagram illustrating an overall structure of a power supply device according to a first embodiment of the present invention.

FIG. 1 is a diagram illustrating an overall structure of a power supply device according to a first embodiment of the present invention. The power supply device according to the first embodiment includes a magneto (AC) generator 1, an electrical storage device 2 as an electrical load to which electric power generated by the magneto generator 1 is supplied, a rectifying unit 3 which rectifies an alternating current generated by the magneto generator 1 to a direct current, a DC voltage transformer 40 for changing a voltage ratio (Vbin/Vrout) between a voltage Vbin between input terminals of the electrical storage device 2 and a voltage Vrout between output terminals of the rectifying unit 3, and a voltage control unit 5 which controls the transformation ratio (Vbin/Vrout).

The magneto generator 1 is formed of a rotor 1a and a stator 1b. The rotor 1a includes magnetic field magnets divided into a plurality of pieces toward an inside of a cylindrical supporting member along its rotation direction (circumferential direction). The stator 1b includes stator windings which are delta-connected. The rotor 1a is connected to a rotary shaft RA which transmits rotation of a torque supplying device RS. For example, in a case of an on-vehicle power supply device, the torque supplying device RS is an internal combustion engine, and the rotor 1a is directly coupled to a crank shaft of the internal combustion engine or is connected to the rotary shaft RA which is connected to the crank shaft via a belt, a gear, or the like. When the rotor 1a rotates along with the rotation of the rotary shaft, an alternating current is generated in the stator windings of the stator 1b. The alternating current generated in the stator 1b is rectified to a direct current by a three-phase diode bridge formed by six diodes D provided in the rectifying unit 3.

The DC voltage transformer 40 transforms the voltage Vrout between the output terminals of the rectifying unit 3 to the voltage Vbin between the input terminals of the electrical storage device 2, and then supplies the electrical storage device 2 with the voltage Vbin. The transformation ratio (Vbin/Vrout) on this occasion is controlled by the voltage control unit 5 in accordance with a signal indicating an operating state of the magneto generator 1 or the torque supplying device RS, such as rpm of the rotor 1a. Note that there is a signal sent from an rpm sensor (not shown) for the rotor 1a as the signal indicating the operating state. Further, in the case where the power supply device is mounted on a vehicle, an example of the signal indicating the operating state is an rpm signal which is obtained by an rpm sensor (not shown) indicating rpm of the crank shaft of the internal combustion engine to which the rotor 1a is coupled or by an electronic control device (not shown) of the internal combustion engine.

Figure 2:
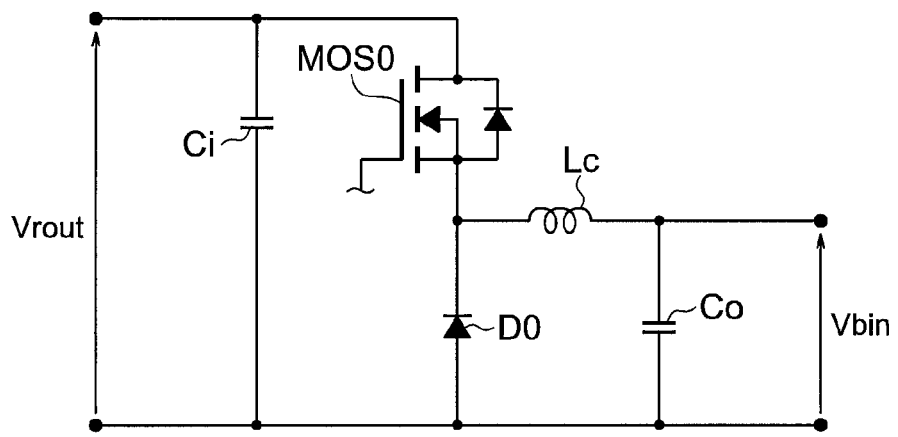
FIG. 2 is a diagram illustrating an example of a circuit forming a DC voltage transformer according to the first and other embodiments of the present invention.

FIG. 2 illustrates an example of a circuit forming the DC voltage transformer 40, which is a step-down non-isolated DC/DC power conversion circuit 4. A pair of input terminals for receiving the voltage Vrout between the output terminals of the rectifying unit 3 are provided at both ends of a capacitor Ci on an input side. A series circuit, which includes a transistor MOS0 formed of a metal oxide semiconductor field effect transistor (MOSFET; hereinafter simply referred to as transistor) and a diode D0 for current feedback, is connected to the capacitor Ci in parallel. A series circuit formed of an inductor Lc and a capacitor Co on an output side is connected to the diode D0 in parallel. A pair of output terminals connected to the input terminals of the electrical storage device 2 are provided at both ends of the capacitor Co, and the voltage Vbin is supplied to the electrical storage device 2.

Then, the voltage control unit 5 controls a signal output to a gate terminal of the transistor MOS0 in accordance with the signal indicating the rpm of the rotor 1a or the operating state corresponding thereto, to thereby adjust the transformation ratio (Vbin/Vrout) between the capacitor Ci on the input side and the capacitor Co on the output side.

Figure 3A:
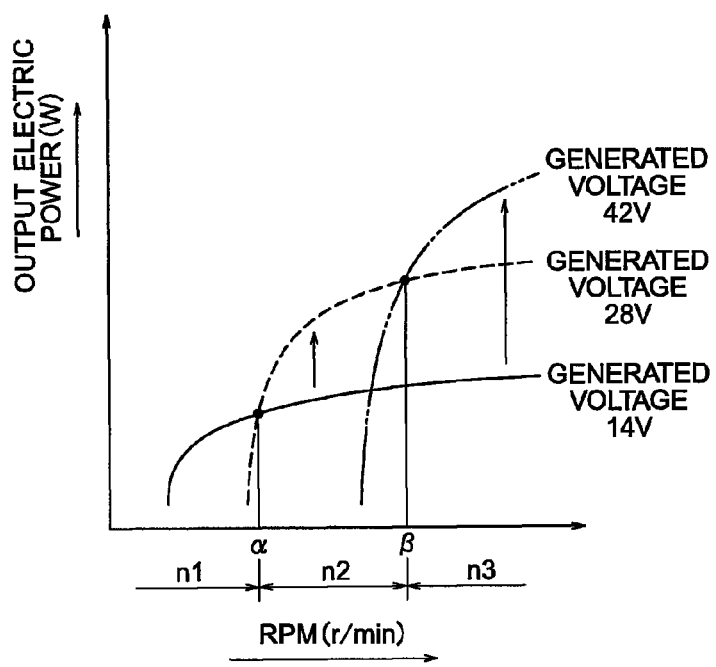
FIG. 3A is a graph illustrating a relationship between output electric power and rpm of a magneto generator according to the first embodiment of the present invention.
Figure 3B:
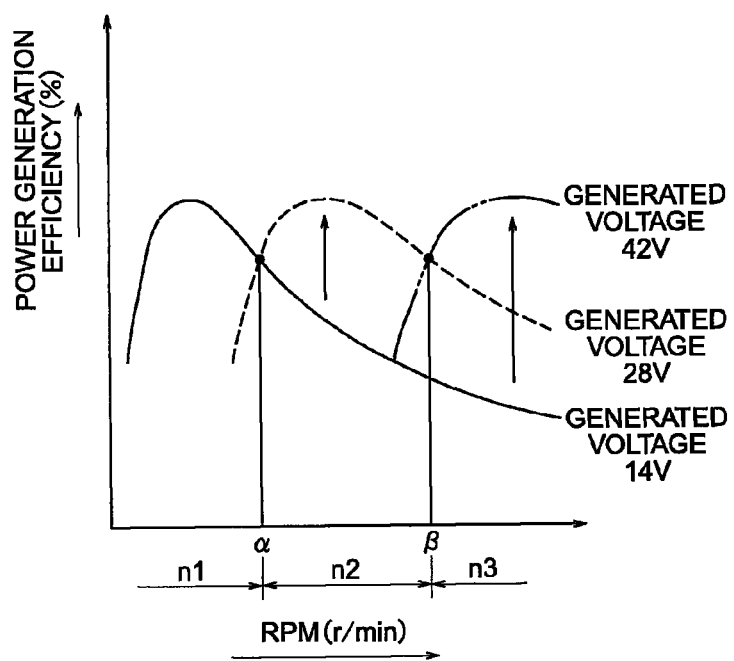
FIG. 3B is a graph illustrating a relationship between power generation efficiency and the rpm of the magneto generator according to the first embodiment of the present invention.

FIGS. 3A and 3B illustrate power generation characteristics of the magneto generator 1 according to the first embodiment of the present invention. FIG. 3A illustrates a relationship between the rpm of the rotor 1a and output electric power (W) of the magneto generator 1 in a case where the generated voltage (Vrout) of the magneto generator 1 is 14 V, 28 V, or 42 V. FIG. 3B illustrates a relationship between the rpm of the rotor 1a and power generation efficiency (%) of the magneto generator 1 in the similar case. It is assumed in FIGS. 3A and 3B that rpm of an intersection between the output characteristic of the generated voltage of 14 V and the output characteristic of the generated voltage of 28 V is $\alpha$, and that rpm of an intersection between the output characteristic of the generated voltage of 28 V and the output characteristic of the generated voltage of 42 V is $\beta$. FIGS. 3A and 3B reveal that, when the generated voltage is 14 V, the output electric power is large and the power generation efficiency is also high in an area n1 in which the rpm is less than $\alpha$. It is also revealed that, when the generated voltage is 28 V, the output electric power is large and the power generation efficiency is also high in an area n2 in which the rpm is equal to or larger than $\alpha$ and less than $\beta$. Further, it is revealed that, when the generated voltage is 42 V, the output electric power is large and the power generation efficiency is also high in an area n3 in which the rpm is equal to or larger than $\beta$. In the above-mentioned areas n1, n2, and n3 of different rpm, the transformation ratio (Vbin/Vrout) of the DC voltage transformer 40 is controlled and switched by the voltage control unit 5 to 1/1, 1/2, and 1/3, respectively, with the result that charging is performed in a state where the voltage Vbin between the input terminals of the electrical storage device 2 is set to 14 V. Accordingly, compared with the conventionally-performed power generation with the single generated voltage, the output electric power as well as the power generation efficiency may be improved.

Figure 4:
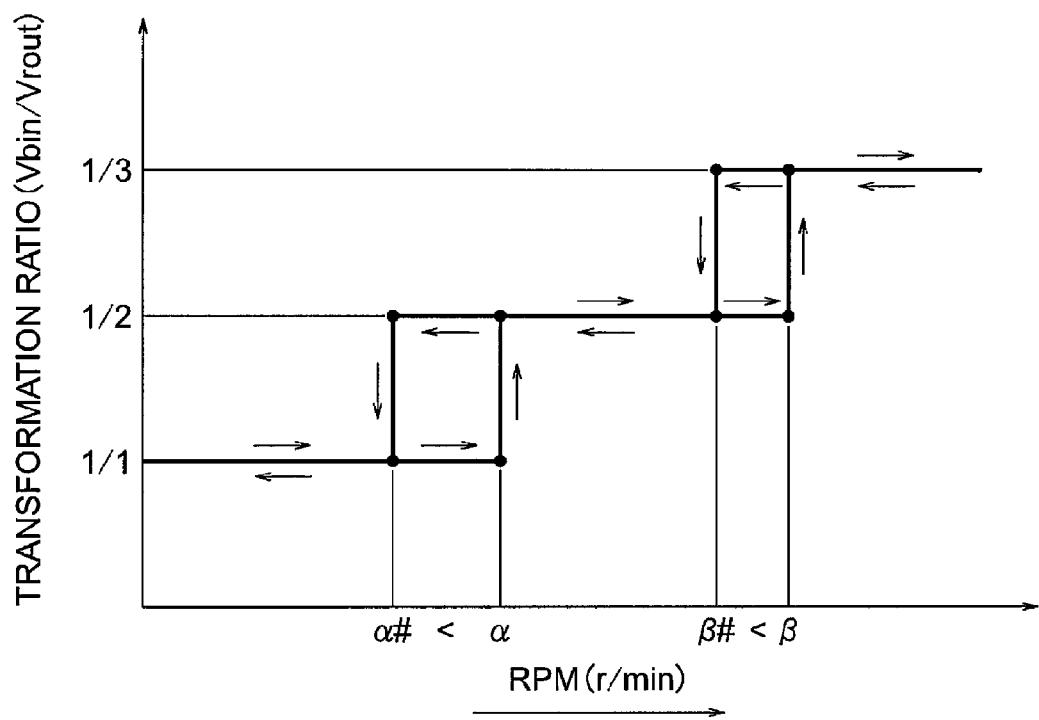
FIG. 4 is a diagram illustrating a relationship between the rpm and a timing at which a transformation ratio is switched according to the first embodiment of the present invention.

Further, as illustrated in FIG. 4, chattering due to minute fluctuations in rotation may be prevented when hysteresis is provided to a timing at which the transformation ratio (Vbin/Vrout) is switched between when the rpm increases and when the rpm decreases. In FIG. 4, a horizontal axis represents the rpm of the rotor 1a, and a vertical axis represents the transformation ratio (Vbin/Vrout). As illustrated in FIG. 4, in a case where it is assumed that the rpm at which the transformation ratio (Vbin/Vrout) is switched from 1/1 to 1/2 is $\alpha$, that the rpm at which the transformation ratio is switched from 1/2 to 1/1 is $\alpha\#$, that the rpm at which the transformation ratio is switched from 1/2 to 1/3 is $\beta$, and that the rpm at which the transformation ratio is switched from 1/3 to 1/2 is $\beta\#$, $\alpha$ is larger than $\alpha\#$ and $\beta$ is larger than $\beta\#$. When the hysteresis is provided to the timing at which the transformation ratio (Vbin/Vrout) is switched between when the rpm increases and when the rpm decreases, chattering due to minute fluctuations in rotation may be prevented.

Note that the transformation ratio (Vbin/Vrout) is switched in three steps of 1/1, 1/2, and 1/3 in the above description, but the number of steps is not limited thereto, and the switching may be made in N steps (N is a natural number). Further, in a case where the transformation ratio (Vbin/Vrout) is switched continuously, operation may be performed with more suitable generated voltage, which further improves the output electric power as well as the power generation efficiency.

In order to realize the above-mentioned operation, as to the magneto generator 1, the relationship among the generated voltage, the rpm of the rotor, and the output electric power (W) of the magneto generator, and the relationship among the generated voltage, the rpm of the rotor, and the power generation efficiency (%) of the magneto generator, which are respectively illustrated in FIGS. 3A and 3B, are obtained in advance through measurement or the like. In addition, a table indicating the relationship between the rpm of the rotor and the transformation ratio of the DC voltage transformer 40 at which excellent power generation efficiency may be obtained, which is based on the above-mentioned relationships, is stored in advance as control information in a memory M of the voltage control unit 5. When the rpm of the rotor is input, the voltage control unit 5 determines the transformation ratio in accordance with the table, and then controls a switch of the transistor MOS0 of the DC voltage transformer 40 illustrated in FIG. 2 so as to obtain the determined transformation ratio. Further, in the case where hysteresis is provided to the above-mentioned timing at which the transformation ratio is switched, a table, which indicates a relationship between the rpm of the rotor for rpm increase and for rpm decrease and the transformation ratio of the DC voltage transformer, may be stored in advance in the memory M of the voltage control unit 5.

Second Embodiment

Figure 5:
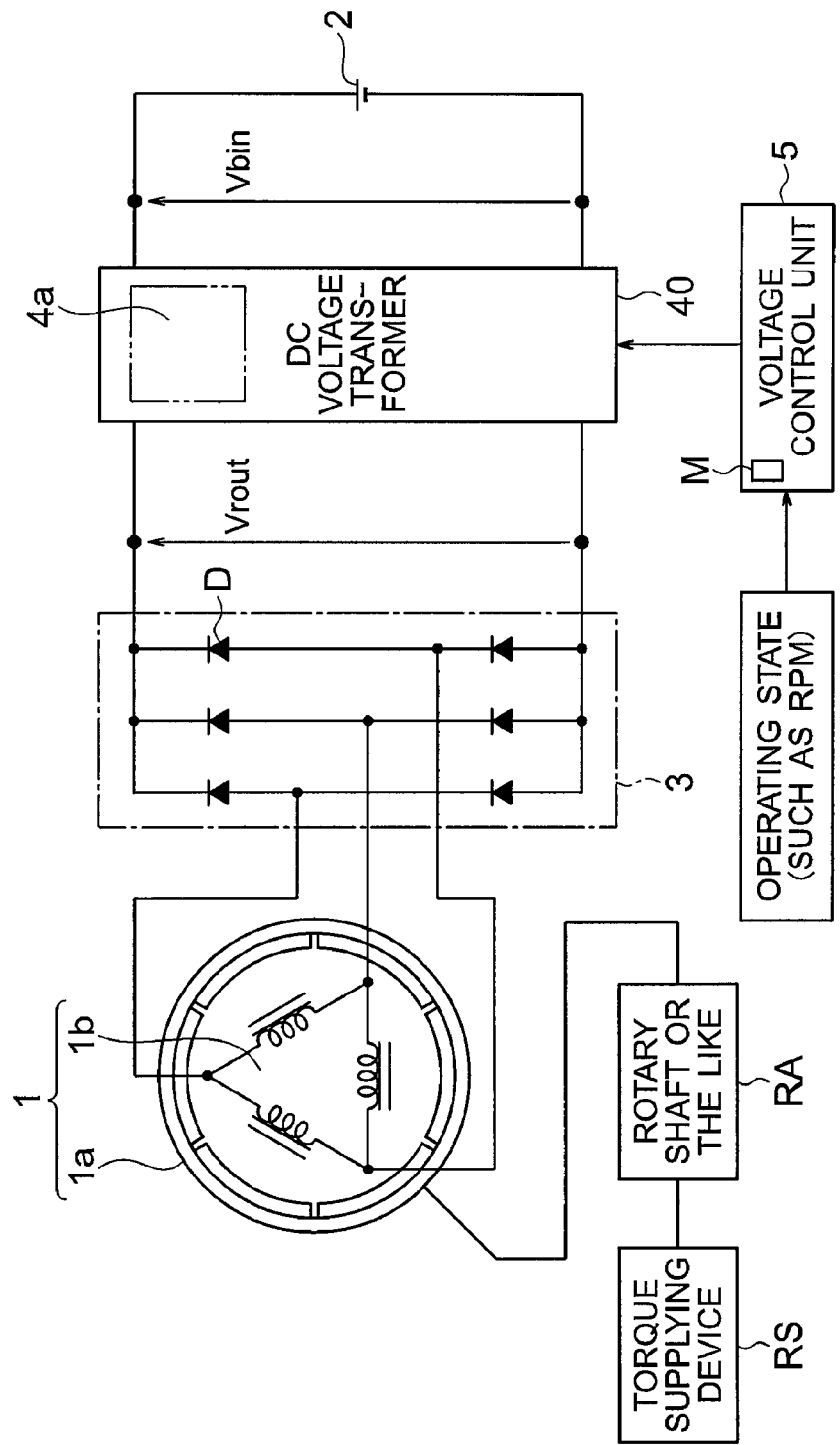
FIG. 5 is a diagram illustrating an overall structure of a power supply device according to a second embodiment of the present invention.

FIG. 5 is a diagram illustrating an overall structure of a power supply device according to a second embodiment of the present invention. The similar or corresponding portions to those of the first embodiment are denoted by the same reference symbols, and detailed description thereof is omitted (the same shall apply hereinafter). The power supply device of FIG. 5 is different from that of the first embodiment in a structure of a circuit 4a of the DC voltage transformer 40 for changing the voltage ratio (Vbin/Vrout) between the voltage Vbin between the input terminals of the electrical storage device 2, and the voltage Vrout between the output terminals of the rectifying unit 3. Accordingly, an operation for controlling the transformation ratio (Vbin/Vrout) of the voltage control unit 5 is different as well.

Figure 6:
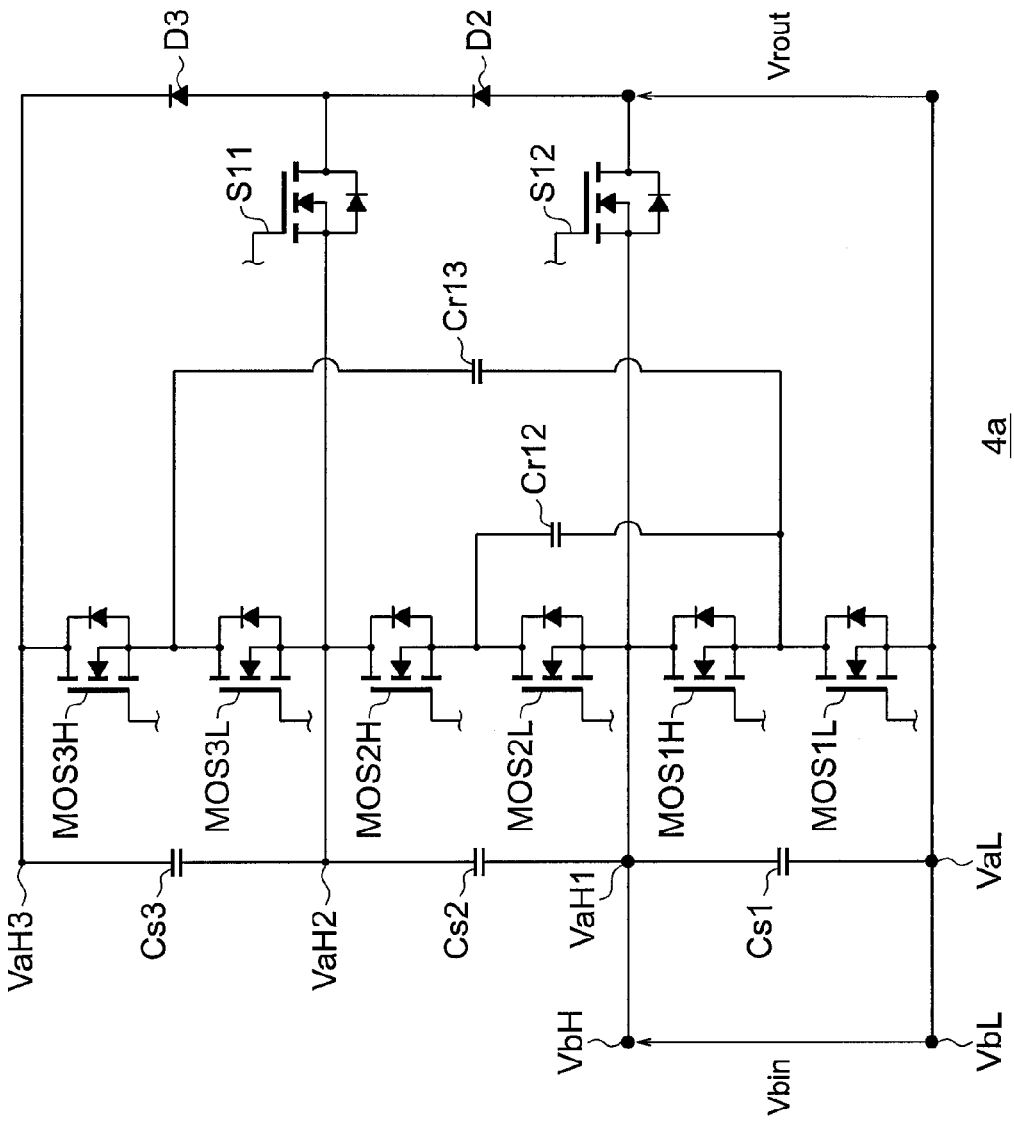
FIG. 6 is a diagram illustrating an example of a circuit forming a DC voltage transformer according to the second and other embodiments of the present invention.

FIG. 6 illustrates an example of the circuit 4a of the DC voltage transformer 40 (which is illustrated opposite in horizontal direction to FIG. 2 and FIG. 5). The circuit 4a of FIG. 6 is formed of a DC/DC power conversion circuit capable of transforming voltage in a plurality of steps. The DC/DC power conversion circuit transforms the voltage Vrout between the output terminals of the rectifying unit 3 to the voltage Vbin between the input terminals of the electrical storage device 2, and then supplies the voltage Vbin to the electrical storage device 2. As in the first embodiment described above, the transformation ratio (Vbin/Vrout) on this occasion is controlled by the voltage control unit 5 in accordance with the operating state of the rotor 1a, such as the rpm.

FIG. 6 illustrates an example of the DC/DC power conversion circuit capable of transforming voltage in three steps. Three smoothing capacitors Cs1 to Cs3 are connected in series from a low-voltage side to a high-voltage side. The smoothing capacitors Cs2 and Cs3 are connected in parallel with diodes D2 and D3 for preventing backflow, respectively. The diodes D2 and D3 are connected in series with each other. A pair of input terminals for receiving the voltage Vrout between the output terminals of the rectifying unit 3 and a pair of output terminals which are connected to the input terminals of the electrical storage device 2 to supply the voltage Vbin are connected to both ends of the smoothing capacitor Cs1 provided on the lowest-voltage side.

To the smoothing capacitors Cs1 to Cs3, series circuits are connected in parallel, which are respectively formed of a pair of transistors of a transistor MOS1H formed of a MOSFET on a high-voltage side and a transistor MOS1L formed of a MOSFET on a low-voltage side, a pair of transistors of a transistor MOS2H on a high-voltage side and a transistor MOS2L on a low-voltage side, and a pair of transistors of a transistor MOS3H on a high-voltage side and a transistor MOS3L on a low-voltage side. Accordingly, the transistors MOS1L, MOS1H, MOS2L, MOS2H, MOS3L, and MOS3H are connected in series in the stated order.

A capacitor Cr13 for energy shift is connected between a connection point between the transistor MOS1H and the transistor MOS1L and a connection point between the transistor MOS3H and the transistor MOS3L. A capacitor Cr12 for energy shift is connected between the connection point between the transistor MOS1H and the transistor MOS1L and a connection point between the transistor MOS2H and the transistor MOS2L.

A transistor S11 for switching which is formed of a MOSFET is connected between a connection point between a cathode of the diode D2 and an anode of the diode D3 and a connection point between the transistor MOS2H and the transistor MOS3L, which is a connection point between the smoothing capacitor Cs2 and the smoothing capacitor Cs3. A transistor S12 for switching which is formed of a MOSFET is connected between the input terminal on the high-voltage side which is an anode side of the diode D2 and a connection point between the transistor MOS1H and the transistor MOS2L, which is a connection point between the smoothing capacitor Cs1 and the smoothing capacitor Cs2.

Next, an operation of the DC/DC power conversion circuit of FIG. 6 is described. The various transistors are controlled by the voltage control unit 5 as described below. When the transistor S11 for switching is turned off and the transistor S12 for switching is turned on, the DC/DC power conversion circuit operates so that the transformation ratio (Vbin/Vrout) between the voltage Vrout between the output terminals of the rectifying unit 3 and the voltage Vbin between the input terminals of the electrical storage device 2 is 1/1. Further, the DC/DC power conversion circuit operates so that the transformation ratio (Vbin/Vrout) is 1/2 when the transistor S11 is turned on and the transistor S12 is turned off, and operates so that the transformation ratio (Vbin/Vrout) is 1/3 when the transistor S11 and the transistor S12 are both turned off.

As a result of the control described above, respective signals output to gate terminals of the other transistors MOS1L to MOS3H are controlled, with the result that the voltage Vbin between the input terminals of the electrical storage device 2, that is, an output voltage of the DC voltage transformer 40 is controlled to a desired voltage.

When the transistor S11 is turned off and the transistor S12 is turned on, the voltage Vrout between the output terminals of the rectifying unit 3 is applied between a terminal VaH1 and a terminal VaL and is output from output terminals VbH and VbL as the voltage Vbin between the input terminals of the electrical storage device 2 without being transformed.

When the transistor S11 is turned on and the transistor S12 is turned off, the voltage Vrout between the output terminals of the rectifying unit 3 is applied between terminals VaH2 and VaL. Further, the transistors MOS2H and MOS1H, which are the high-voltage side MOSFETs, and the transistors MOS2L and MOS1L, which are the low-voltage side MOSFETs, are repeatedly turned on and off in an alternating manner. Then, when the transistors MOS2H and MOS1H, which are the high-voltage side MOSFETs, are both turned on, a part of energy stored in the smoothing capacitor Cs2 is, due to a voltage difference therebetween, shifted to the capacitor Cr12 via the following path.

$$Cs2 \to MOS2H \to Cr12 \to MOS1H$$

Next, when the transistors MOS2L and MOS1L, which are the low-voltage side MOSFETs, are both turned on, the energy charged in the capacitor Cr12 is, due to a voltage difference therebetween, shifted to the smoothing capacitor Cs1 via the following path.

$$Cr12 \to MOS2L \to Cs1 \to MOS1L$$

In this manner, as a result of charging/discharging of the capacitor Cr12, the energy is shifted from the smoothing capacitor Cs2 to the smoothing capacitor Cs1. Then, the voltage Vrout between the output terminals of the rectifying unit 3, which is input between the terminal VaH2 and the terminal VaL, is stepped down to a voltage about one half thereof, and is output as the voltage Vbin between the input terminals of the electrical storage device 2 from the output terminals VbH and VbL.

When the transistors S11 and S12 are both turned off, the voltage Vrout between the output terminals of the rectifying unit 3 is applied between terminals VaH3 and VaL. The transistors MOS3H, MOS2H, and MOS1H, which are the high-voltage side MOSFETs, and the transistors MOS3L, MOS2L, and MOS1L, which are the low-voltage side MOSFETs, are repeatedly turned on and off in an alternating manner. Then, when the transistors MOS3H, MOS2H, and MOS1H, which are the high-voltage side MOSFETs, are all turned on, a part of energy stored in the smoothing capacitors Cs2 and Cs3 is, due to a voltage difference thereamong, shifted to the capacitors Cr12 and Cr13 via the following paths.

$$Cs2 \to Cs3 \to MOS3H \to Cr13 \to MOS1H$$

$$Cs2 \to MOS2H \to Cr12 \to MOS1H$$

Next, when the transistors MOS3L, MOS2L, and MOS1L, which are the low-voltage side MOSFETs, are all turned on, the energy charged in the capacitors Cr12 and Cr13 is, due to a voltage difference thereamong, shifted to the smoothing capacitors Cs1 and Cs2 via the following paths.

$Cr13 \rightarrow MOS3L \rightarrow Cs2 \rightarrow Cs1 \rightarrow MOS1L$ $Cr12 \rightarrow MOS2L \rightarrow Cs1 \rightarrow MOS1L$ In this manner, as a result of charging/discharging of the capacitors Cr12 and Cr13, the energy is shifted from the smoothing capacitors Cs2 and Cs3 to the smoothing capacitors Cs1 and Cs2. Then, the voltage Vrout between the output terminals of the rectifying unit 3, which is input between the terminal VaH3 and the terminal VaL, is stepped down to a voltage about one third thereof, and is output as the voltage Vbin between the input terminals of the electrical storage device 2 from the output terminals VbH and VbL.

Then, as in the case of the power supply device according to the first embodiment described above, the transformation ratio (Vbin/Vrout) of the circuit 4a of FIG. 6 is controlled and switched by the voltage control unit 5 to 1/1, 1/2, and 1/3 in the areas of n1, n2, and n3 of different rpm of the magneto generator 1, respectively, as illustrated in FIGS. 3A and 3B. Accordingly, charging may be performed with the voltage Vbin between the input terminals of the electrical storage device 2 being set to 14 V. Therefore, compared with the conventionally-performed power generation with the single generated voltage, the output electric power as well as the power generation efficiency may be improved.

Further, compared with the step-down non-isolated DC/DC power conversion circuit (DC voltage transformer) illustrated in FIG. 2, the voltage applied to each portion is divided into one third thereof, and hence a compact element with a lower withstand voltage compared with that of the first embodiment may be selected. Accordingly, a size, weight, and cost of the circuit of the DC voltage transformer 40 may be reduced.

Third Embodiment

Figure 7:
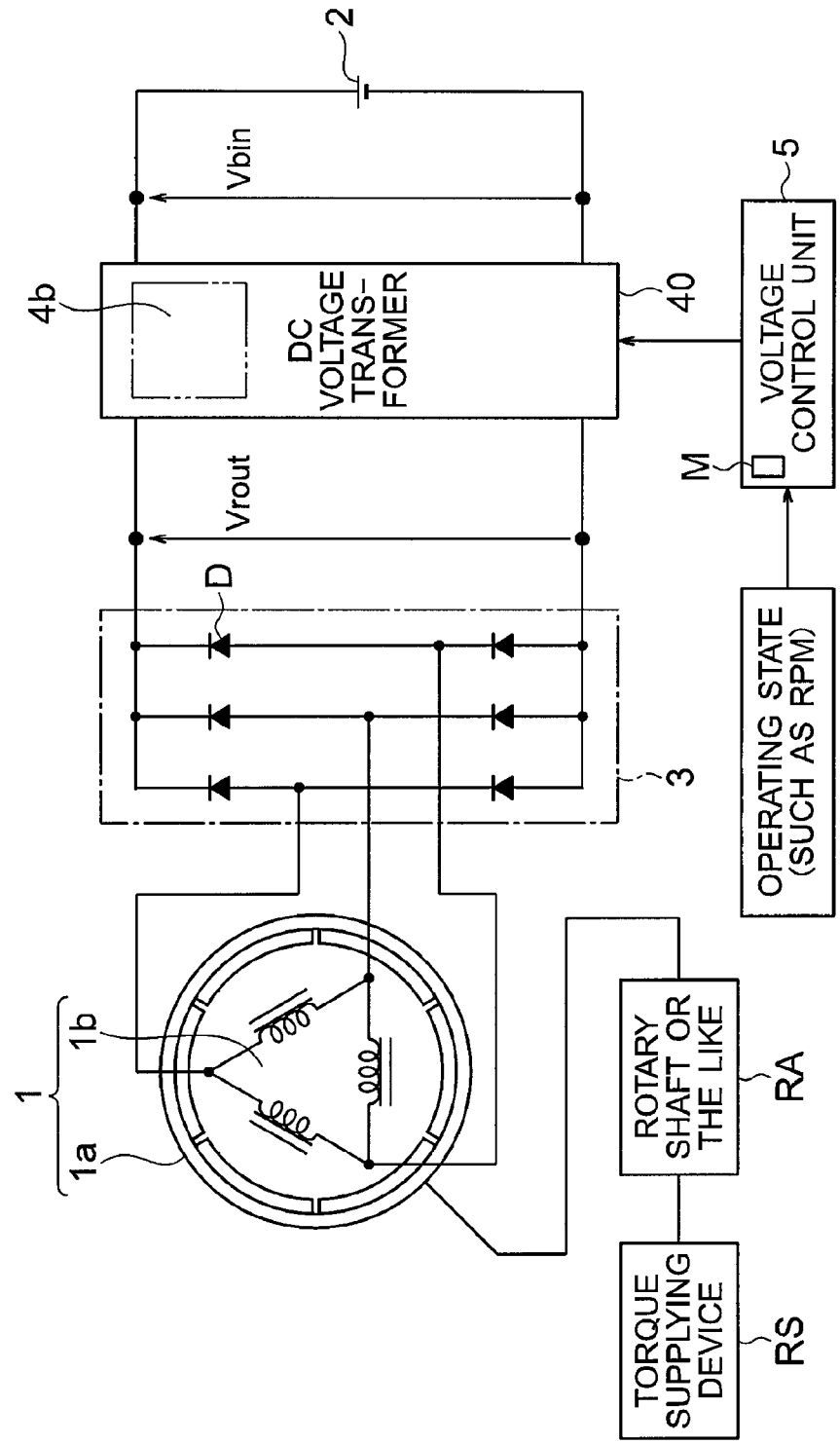
FIG. 7 is a diagram illustrating an overall structure of a power supply device according to a third embodiment of the present invention.

FIG. 7 is a diagram illustrating an overall structure of a power supply device according to a third embodiment of the present invention. The similar or corresponding portions to those of the above-mentioned embodiments are denoted by the same reference symbols, and detailed description thereof is omitted. The power supply device of FIG. 7 is different from those of the above-mentioned embodiments in a structure of a circuit 4b of the DC voltage transformer 40 for changing the voltage ratio (Vbin/Vrout) between the voltage Vbin between the input terminals of the electrical storage device 2, and the voltage Vrout between the output terminals of the rectifying unit 3. Accordingly, an operation for controlling the transformation ratio (Vbin/Vrout) of the voltage control unit 5 is different as well.

Figure 8:
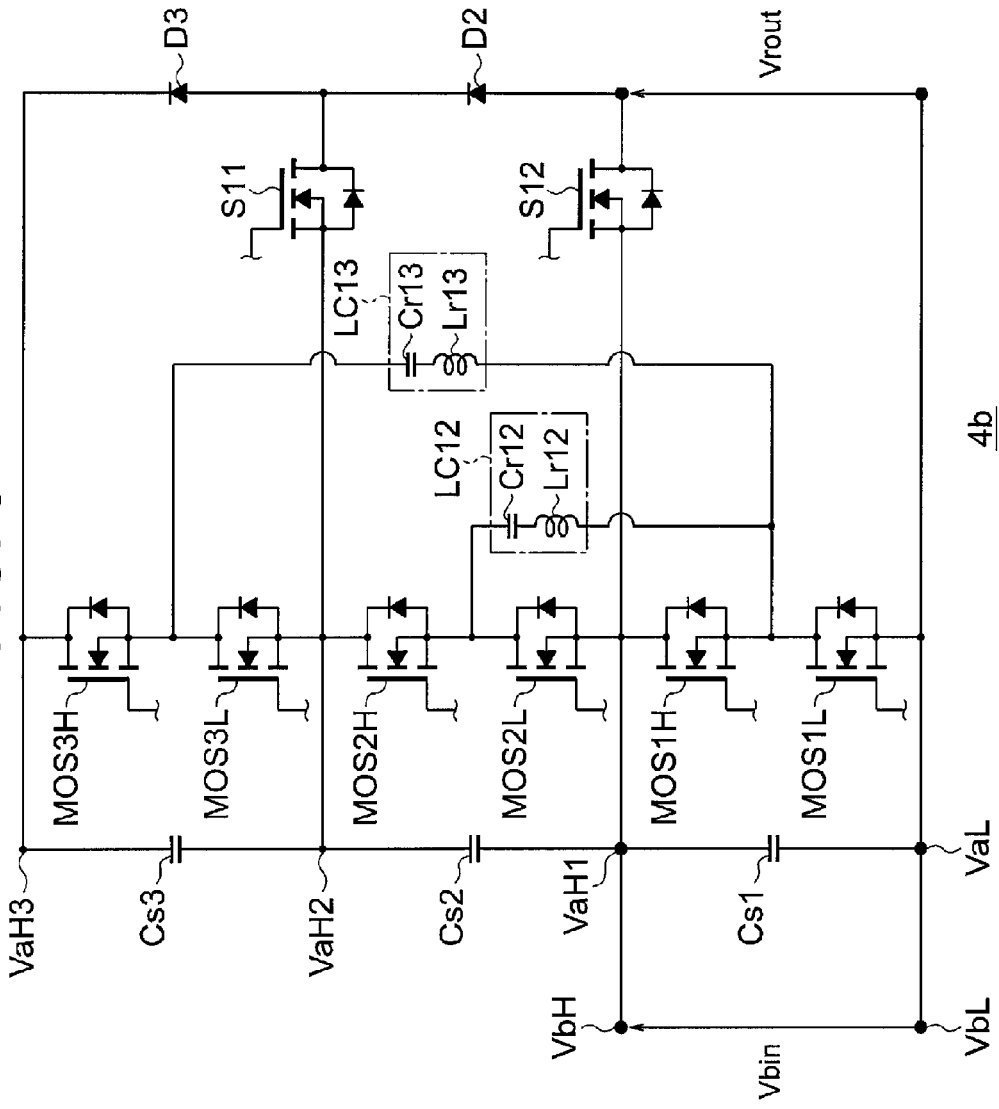
FIG. 8 is a diagram illustrating an example of a circuit forming a DC voltage transformer according to the third and other embodiments of the present invention.

FIG. 8 illustrates an example of a DC/DC power conversion circuit which forms the circuit 4b of the DC voltage transformer 40 and is capable of transforming voltage in three steps (which is illustrated opposite in horizontal direction to FIG. 7). The circuit 4b of FIG. 8 is different from the circuit 4a of FIG. 6 in that an inductor Lr12 is provided in a path in which the capacitor Cr12 for energy shift is charged/discharged, and that an inductor Lr13 is provided in a path in which the capacitor Cr13 for energy shift is charged/discharged. In addition, setting is made such that an LC series circuit LC12 and an LC series circuit LC13 have the same resonance period. The LC series circuit LC12 is formed of a series circuit of the capacitor Cr12 for energy shift and the inductor Lr12, and the LC series circuit LC13 is formed of a series circuit of the capacitor Cr13 for energy shift and the inductor Lr13.

Next, an operation of the DC/DC power conversion circuit of FIG. 8 is described. The various transistors are controlled by the voltage control unit 5 as described below. When the transistor S11 for switching is turned off and the transistor S12 for switching is turned on, the DC/DC power conversion circuit operates so that the transformation ratio (Vbin/Vrout) between the voltage Vrout between the output terminals of the rectifying unit 3 and the voltage Vbin between the input terminals of the electrical storage device 2 is 1/1. Further, the DC/DC power conversion circuit operates so that the transformation ratio (Vbin/Vrout) is 1/2 when the transistor S11 is turned on and the transistor S12 is turned off, and operates so that the transformation ratio (Vbin/Vrout) is 1/3 when the transistor S11 and the transistor S12 are both turned off.

When the transistor S11 is turned off and the transistor S12 is turned on, the voltage Vrout between the output terminals of the rectifying unit 3 is applied between the terminal VaH1 and the terminal VaL and is output from the output terminals VbH and VbL as the voltage Vbin between the input terminals of the electrical storage device 2 without being transformed.

When the transistor S11 is turned on and the transistor S12 is turned off, the voltage Vrout between the output terminals of the rectifying unit 3 is applied between the terminals VaH2 and VaL. Further, the transistors MOS2H and MOS1H, which are the high-voltage side MOSFETs, and the transistors MOS2L and MOS1L, which are the low-voltage side MOSFETs, are repeatedly turned on and off in an alternating manner with a period substantially equal to a resonance period T of the LC series circuit LC12 and with a duty ratio of about 50%. When the transistors MOS2H and MOS1H, which are the high-voltage side MOSFETs, are both turned on, a part of energy stored in the smoothing capacitor Cs2 is, due to a voltage difference therebetween, shifted to the capacitor Cr12 via the following path.

$Cs2 \rightarrow MOS2H \rightarrow Cr12 \rightarrow Lr12 \rightarrow MOS1H$

Next, when the transistors MOS2L and MOS1L, which are the low-voltage side MOSFETs, are both turned on, the energy charged in the capacitor Cr12 is, due to a voltage difference therebetween, shifted to the smoothing capacitor Cs1 via the following path.

$Cr12 \rightarrow MOS2L \rightarrow Cs1 \rightarrow MOS1L \rightarrow Lr12$

In this manner, as a result of charging/discharging of the capacitor Cr12, the energy is shifted from the smoothing capacitor Cs2 to the smoothing capacitor Cs1. Then, the voltage Vrout between the output terminals of the rectifying unit 3, which is input between the terminal VaH2 and the terminal VaL, is stepped down to a voltage about one half thereof, and is output as the voltage Vbin between the input terminals of the electrical storage device 2 from the output terminals VbH and VbL.

When the transistors S11 and S12 are both turned off, the voltage Vrout between the output terminals of the rectifying unit 3 is applied between the terminals VaH3 and VaL. The transistors MOS3H, MOS2H, and MOS1H, which are the high-voltage side MOSFETs, and the transistors MOS3L, MOS2L, and MOS1L, which are the low-voltage side MOSFETs, are repeatedly turned on and off in an alternating manner with a period substantially equal to the resonance period T of the LC series circuits LC12 and LC13 and with a duty ratio of about 50%. When the transistors MOS3H, MOS2H, and MOS1H, which are the high-voltage side MOSFETs, are all turned on, a part of energy stored in the smoothing capacitors Cs2 and Cs3 is, due to a voltage difference thereamong, shifted to the capacitors Cr12 and Cr13 via the following paths.

$Cs2 \rightarrow Cs3 \rightarrow MOS3H \rightarrow Cr13 \rightarrow Lr13 MOS1H$ $Cs2 \rightarrow MOS2H \rightarrow Cr12 \rightarrow Lr12 \rightarrow MOS1H$ Next, when the transistors MOS3L, MOS2L, and MOS1L, which are the low-voltage side MOSFETs, are all turned on, the energy charged in the capacitors Cr12 and Cr13 is, due to a voltage difference thereamong, shifted to the smoothing capacitors Cs1 and Cs2 via the following paths.

$Cr13 \rightarrow MOS3L \rightarrow Cs2 \rightarrow Cs1 \rightarrow MOS1L \rightarrow Lr13$ $Cr12 \rightarrow MOS2L \rightarrow Cs1 \rightarrow MOS1L \rightarrow Lr12$ In this manner, as a result of charging/discharging of the capacitors Cr12 and Cr13, the energy is shifted from the smoothing capacitors Cs2 and Cs3 to the smoothing capacitors Cs1 and Cs2. Then, the voltage Vrout between the output terminals of the rectifying unit 3, which is input between the terminal VaH3 and the terminal VaL, is stepped down to a voltage about one third thereof, and is output as the voltage Vbin between the input terminals of the electrical storage device 2 from the output terminals VbH and VbL.

Then, as in the case of the power supply device according to the first embodiment described above, the transformation ratio (Vbin/Vrout) of the circuit 4b of FIG. 8 is controlled and switched by the voltage control unit 5 to 1/1, 1/2, and 1/3 in the areas of n1, n2, and n3 of different rpm of the magneto generator 1, respectively, as illustrated in FIGS. 3A and 3B. Accordingly, charging may be performed with the voltage Vbin between the input terminals of the electrical storage device 2 being set to 14 V. Therefore, compared with the conventionally-performed power generation with the single generated voltage, the output electric power as well as the power generation efficiency may be improved.

Further, compared with the step-down non-isolated DC/DC power conversion circuit (DC voltage transformer) illustrated in FIG. 2, the voltage applied to each portion is divided into one third thereof, and hence an element with a lower withstand voltage compared with that of the first embodiment may be selected. Accordingly, a size, weight, and cost thereof may be reduced.

Further, the inductor Lr12 and the inductor Lr13 are connected in series with the capacitor Cr12 and the capacitor Cr13, respectively, so that the series circuits LC12 and LC13 may be formed. As a result, the energy is shifted using a resonance phenomenon, and transient loss of the energy at a time when the state of the switching element is changed (between turned on and off) is reduced, with the result that a radiator (not shown) for cooling the circuit may be reduced in size. Moreover, because transient loss of the energy at a time when the switching element is switched is reduced, a switching frequency may be increased. That is, resonance frequencies of the LC series circuits LC12 and LC13 may be set to be high while capacitance values of the capacitors Cr12 and Cr13 for energy shift and inductance values of the inductors Lr12 and Lr13 are both set to be small, and hence, a size, weight, and cost of the circuit element may be reduced.

Fourth Embodiment

Figure 9:
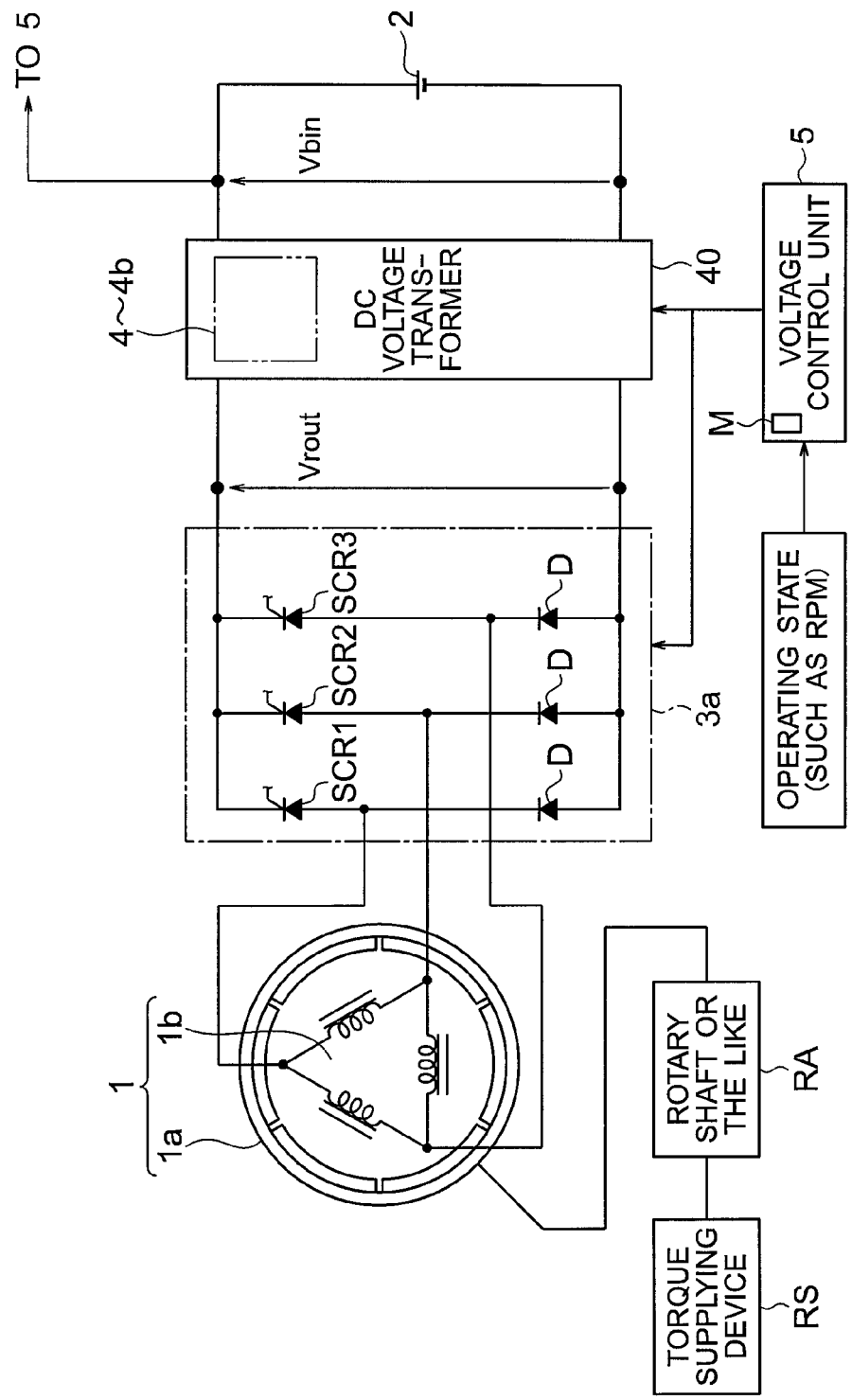
FIG. 9 is a diagram illustrating an overall structure of a power supply device according to a fourth embodiment of the present invention.

FIG. 9 is a diagram illustrating an overall structure of a power supply device according to a fourth embodiment of the present invention. The similar or corresponding portions to those of the embodiments described above are denoted by the same reference symbols, and detailed description thereof is omitted. In the power supply device of FIG. 9, a rectifying unit 3a has a structure different from those of the embodiments described above. Further, the DC voltage transformer 40 may be formed of the DC/DC power conversion circuit according to any one of the embodiments described above.

A three-phase diode bridge provided in the rectifying unit 3a is formed of diodes D which are provided on a negative wave side and of thyristors SCR1, SCR2, and SCR3 which are provided in place of diodes on a positive wave side. In a case where the voltage Vbin between the input terminals of the electrical storage device 2 (or output voltage of the DC voltage transformer 40) is equal to or larger than a predetermined value, respective gate signals of the thyristors SCR1, SCR2, and SCR3 are turned off so that electrical conduction from the rectifying unit 3a to the DC voltage transformer 40 may be interrupted. On the other hand, in a case where the voltage Vbin between the input terminals of the electrical storage device 2 is less than the predetermined value, the respective gate signals of the thyristors SCR1, SCR2, and SCR3 are turned on so that electrical conduction may be provided from the rectifying unit 3a to the DC voltage transformer 40. In this manner, the voltage Vbin between the input terminals of the electrical storage device 2 is adjusted to the predetermined value.

Note that, in order that the rectifying unit 3a may have the function described above, the voltage control unit 5 detects the voltage Vbin between the input terminals of the electrical storage device 2 or the output voltage of the DC voltage transformer 40 by using a voltage detector (not shown), and changes the respective gate signals of the thyristors SCR1, SCR2, and SCR3 in accordance with a comparison result between the detected voltage and the predetermined value as a control target (whether the detected voltage is equal to or larger than, or less than the predetermined value). For the purpose of this, the voltage control unit 5 stores the above-mentioned predetermined value as the control target in the memory M as control information.

Note that the thyristors SCR1, SCR2, and SCR3 together form opening means for interrupting (opening) the electrical conduction from the rectifying unit 3a to the DC voltage transformer 40 so that the output of the magneto generator 1 may be opened. Further, the opening means and the voltage control unit 5 together form output control means.

According to the power supply device of this embodiment, an amount of current supply to the electrical storage device 2 may be adjusted without changing the rpm of the rotor 1a in a case where the electrical storage device 2 is supplied with an excessive current.

Further, a no-load induced voltage of the magneto generator 1 becomes higher than a voltage in a normal load state, and hence an element with high withstand voltage needs to be used in consideration of the no-load induced voltage. However, electrical conduction is interrupted by the rectifying unit 3a, and hence only the rectifying unit 3a needs to use the element with high withstand voltage in consideration of the no-load induced voltage, while the DC voltage transformer 40 may use an element with low withstand voltage. Accordingly, a size, weight, and cost of the power supply device may be reduced.

Fifth Embodiment

Figure 10:
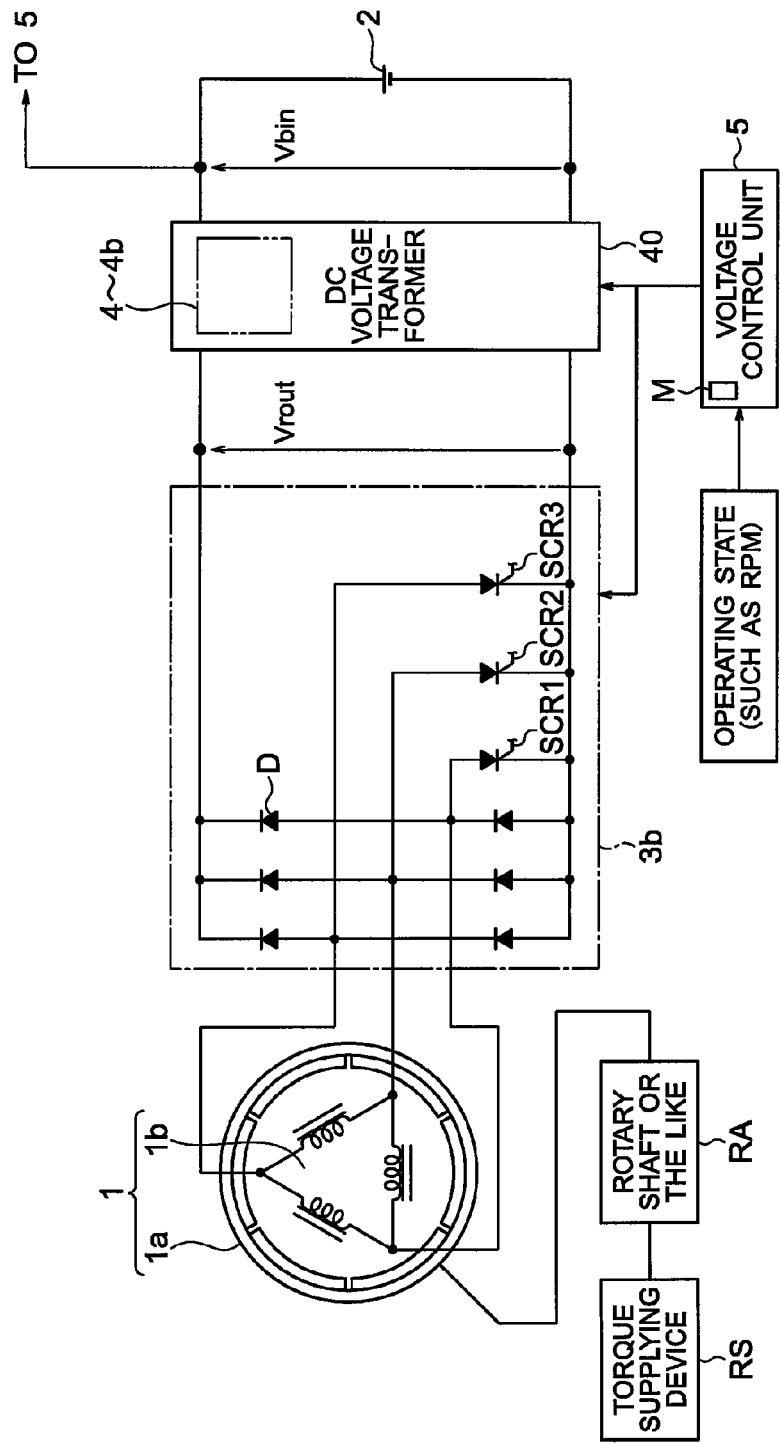
FIG. 10 is a diagram illustrating an overall structure of a power supply device according to a fifth embodiment of the present invention.

FIG. 10 is a diagram illustrating an overall structure of a power supply device according to a fifth embodiment of the present invention. The similar or corresponding portions to those of the embodiments described above are denoted by the same reference symbols, and detailed description thereof is omitted. In the power supply device of FIG. 10, a rectifying unit 3b has a structure different from those of the embodiments described above. Further, the DC voltage transformer 40 may be formed of the DC/DC power conversion circuit according to any one of the embodiments described above.

In a three-phase diode bridge provided in the rectifying unit 3b, between respective input terminals for three phases which receive input from the magneto generator 1 and anode terminals of the diodes D on the negative wave side, the thyristors SCR1, SCR2, and SCR3 are provided with a direction from the respective input terminals for three phases to the anode terminals of the diodes D on the negative wave side being as a forward direction. In the case where the voltage Vbin between the input terminals of the electrical storage device 2 (or output voltage of the DC voltage transformer 40) is equal to or larger than a predetermined value, the respective gate signals of the thyristors SCR1, SCR2, and SCR3 are turned on so that the output end of the magneto generator 1 may be electrically short-circuited (returned). On the other hand, in the case where the voltage Vbin between the input terminals of the electrical storage device 2 is less than the predetermined value, the respective gate signals of the thyristors SCR1, SCR2, and SCR3 are turned off so that the direct current may be supplied to the DC voltage transformer 40 via the three-phase diode bridge provided in the rectifying unit 3b. Accordingly, the voltage Vbin between the input terminals of the electrical storage device 2 is adjusted to the predetermined value.

Note that, in order that the rectifying unit 3b may have the function described above, the voltage control unit 5 detects the voltage Vbin between the input terminals of the electrical storage device 2 or the output voltage of the DC voltage transformer 40 by using a voltage detector (not shown), and changes the respective gate signals of the thyristors SCR1, SCR2, and SCR3 in accordance with a comparison result between the detected voltage and the predetermined value as a control target (whether the detected voltage is equal to or larger than, or less than the predetermined value). For the purpose of this, the voltage control unit 5 stores the above-mentioned predetermined value as the control target in the memory M as control information.

Note that the thyristors SCR1, SCR2, and SCR3 together form short-circuiting means for short-circuiting the output of the magneto generator 1. Further, the short-circuiting means and the voltage control unit 5 together form output control means.

According to the power supply device of this embodiment, an amount of current supply to the electrical storage device 2 may be adjusted without changing the rpm of the rotor 1a in a case where the electrical storage device 2 is supplied with an excessive current.

Further, the no-load induced voltage of the magneto generator 1 is not directly applied to the rectifying unit 3b, and hence there is no need to use a large-scale element with high withstand voltage in consideration of the no-load induced voltage. Accordingly, a compact element with low withstand voltage may be selected as the rectifying unit 3b and the DC voltage transformer 40, and therefore a size, weight, and cost of the power supply device may be reduced.

Sixth Embodiment

Figure 11:
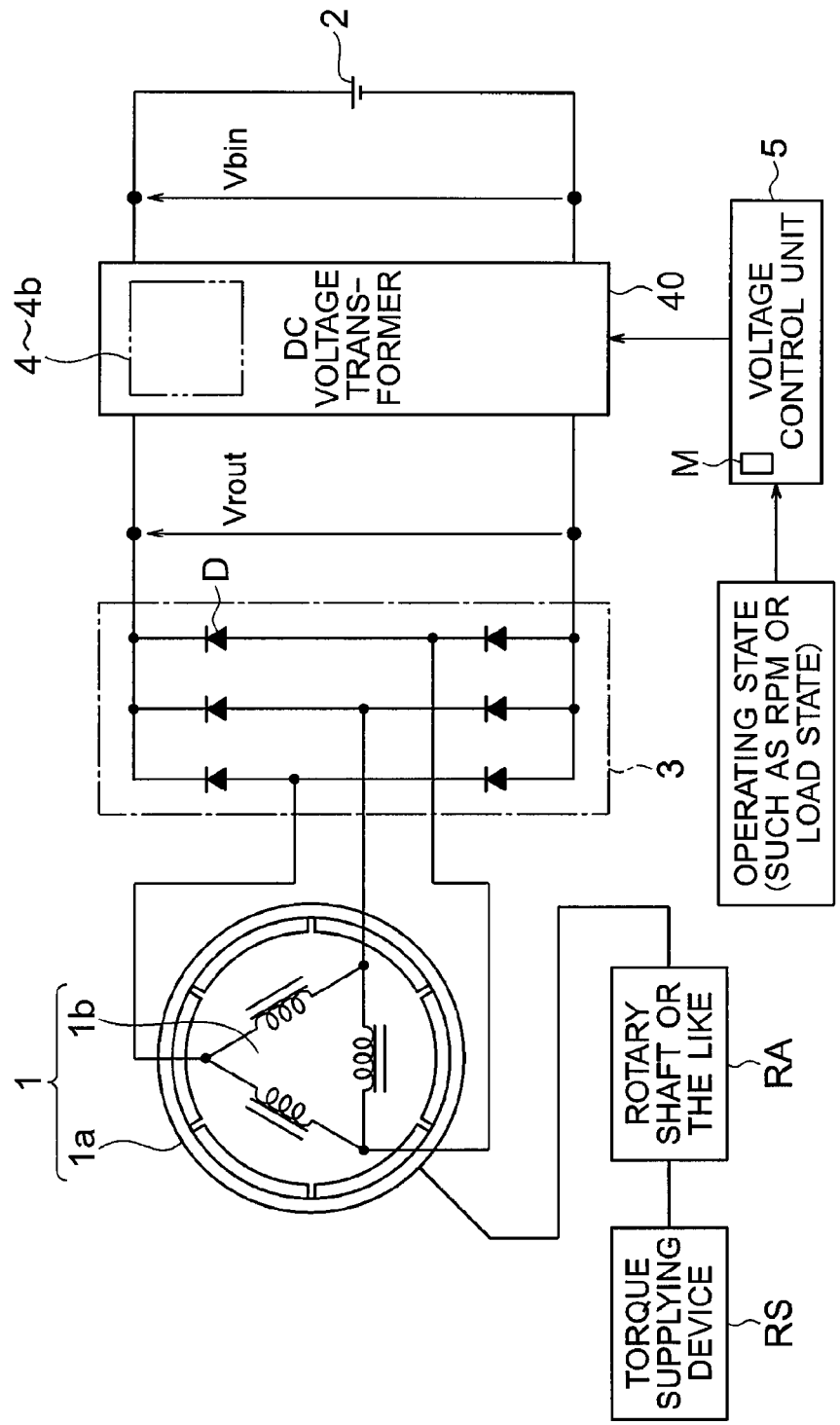
FIG. 11 is a diagram illustrating an overall structure of a power supply device according to a sixth embodiment of the present invention.

FIG. 11 is a diagram illustrating an overall structure of a power supply device according to a sixth embodiment of the present invention. The similar or corresponding portions to those of the embodiments described above are denoted by the same reference symbols, and detailed description thereof is omitted. In the power supply device of FIG. 11, the transformation ratio (Vbin/Vrout) of the DC voltage transformer 40 is controlled by the voltage control unit 5 in accordance with the rpm of the rotor 1a, the operating load state of the torque supplying device, and the like. For this reason, the voltage control unit 5 stores in advance information necessary for the above-mentioned control in the memory M as control information in the form of, for example, a table. Further, the DC voltage transformer 40 may be formed of the DC/DC power conversion circuit according to any one of the embodiments described above.

Figure 12:
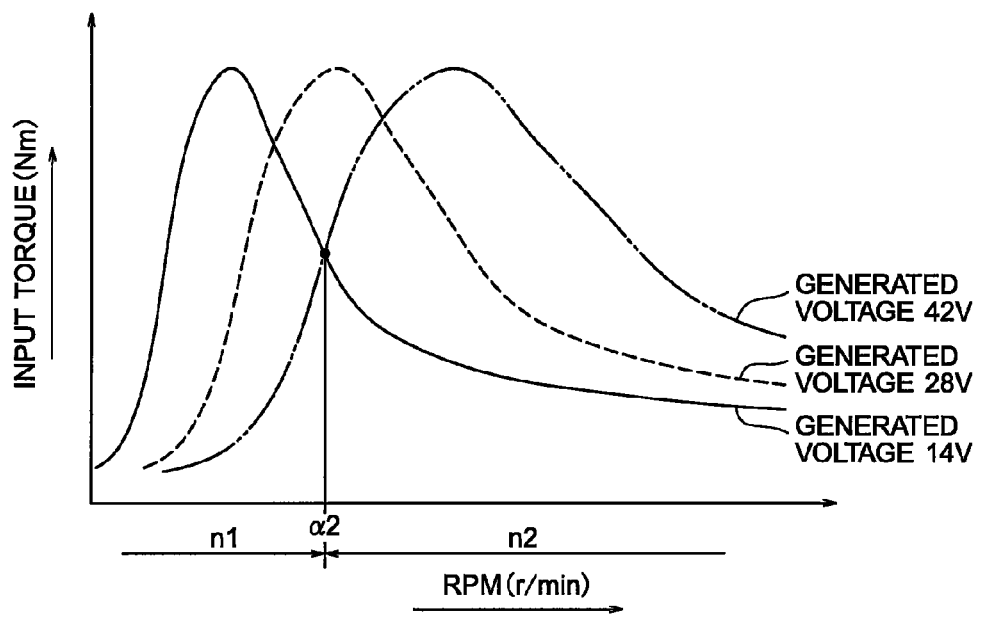
FIG. 12 is a graph illustrating a relationship between rpm and input torque to a magneto generator according to the sixth embodiment of the present invention.

FIG. 12 illustrates a relationship between the rpm and input torque to the magneto generator 1 in the case where the generated voltage of the magneto generator 1 according to this embodiment is 14 V, 28 V, or 42 V. When rpm of an intersection between input torque of 14 V and input torque of 42 V illustrated in FIG. 12 is represented by α2, in an area n1 in which the rpm is less than α2, the input torque (input energy) is smaller in the case of the generated voltage of 42 V. Meanwhile, in an area n2 in which the rpm is equal to or larger than α2, the input torque (input energy) is smaller in the case of the generated voltage of 14 V. In a case where the operating load state of the torque supplying device is determined to be a high-load state (for example, during accelerating or climbing), the voltage control unit 5 switches the transformation ratio (Vbin/Vrout) of the DC voltage transformer 40 in the rpm areas n1 and n2 to 1/3 (in the n1 area) and 1/1 (in the n2 area), respectively, and then controls the switched transformation ratio. Accordingly, the input torque to the magneto generator 1 may be reduced, which enables a reduction in load of the torque supplying device.

Note that, as to the operating load state of the torque supplying device, when the torque supplying device is, for example, an internal combustion engine, a signal indicating the operating load state may be obtained from an electric control device or the like of the internal combustion engine.

Figure 13:
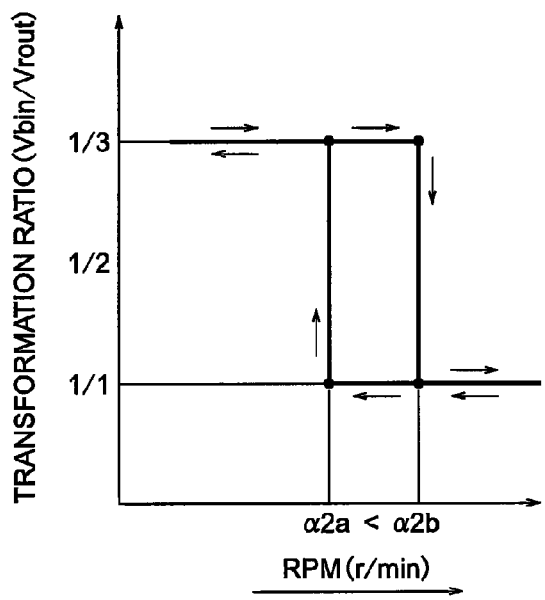
FIG. 13 is a graph illustrating a relationship between the rpm and a timing at which a transformation ratio is switched according to the sixth embodiment of the present invention.

Further, in a case where the rpm at which the transformation ratio (Vbin/Vrout) is switched from 1/3 to 1/1 is represented by α2b and the rpm at which the transformation ratio is switched from 1/1 to 1/3 is represented by α2a as illustrated in FIG. 13, α2b is set to be larger than α2a. As a result, hysteresis may be provided to a timing at which the transformation ratio (Vbin/Vrout) is switched between when the rpm increases and when the rpm decreases, to thereby prevent chattering due to minute fluctuations in rotation.

Therefore, the voltage control unit 5 according to this embodiment further stores information relating to the relationships between the transformation ratio and the rpm areas, which are illustrated in FIGS. 12 and 13 and set in the case where the torque supplying device is in the high-load state, in the memory M as control information in the form of, for example, a table.

In the sixth embodiment described above, in a case where the load state of the torque supplying device is determined to be a low-load state (for example, during decelerating, idling, or descending), the voltage control unit 5 controls the transformation ratio (Vbin/Vrout) of the DC voltage transformer 40 so that the current supplied to the electrical storage device 2 may become the maximum.

Note that, specifically, as a signal indicating the load state of the torque supplying device according to the present invention, for example, a signal indicating rpm of the internal combustion engine is input to the voltage control unit 5. Further, in order to accurately determine whether the torque supplying device is in the high-load state (for example, during accelerating or climbing) or the low-load state (for example, during decelerating, idling, or descending), the voltage control unit 5 may receive any one of a signal indicating an internal pressure of an intake pipe of the internal combustion engine, a signal indicating a throttle opening of the internal combustion engine, and a signal indicating a temperature of cooling water for cooling the internal combustion engine from an electronic control device of the internal combustion engine or the like, to thereby determine the load state in accordance with a reference value stored in advance. Alternatively, the voltage control unit 5 may receive a plurality of the signals described above to determine the load state in accordance with a reference value stored in advance based on combinations of the signals.

Note that, in the description of the first to sixth embodiments described above, the step-down DC/DC power conversion circuit is used to form the DC voltage transformer, and hence the transformation ratio of the DC voltage transformer is 1/N (N is a natural number), which is equal to or less than 1. However, the DC voltage transformer may be formed of a step-up DC/DC power conversion circuit, and in such a case, a transformation ratio of the DC voltage transformer is N (N is a natural number), which is equal to or larger than 1.

Figure 14A:
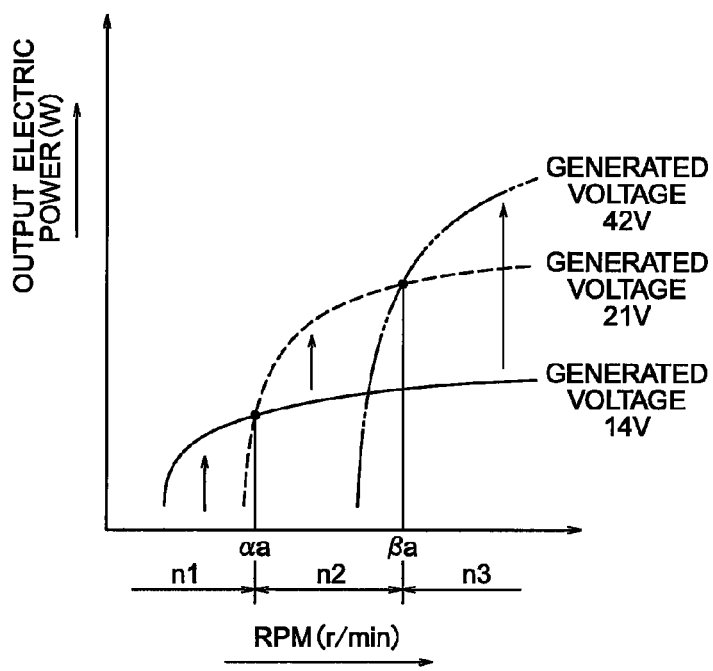
FIGS. 14A and 14B are graphs for describing operations in a case where the DC voltage transformer of the power supply device according to the present invention is formed of a step-up power conversion circuit.
Figure 14B:
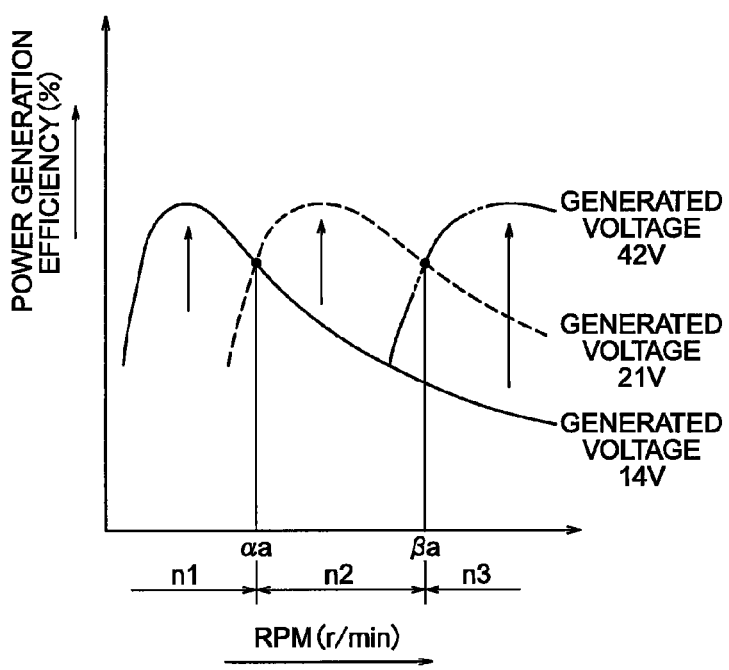

FIGS. 14A and 14B illustrate power generation characteristics of the magneto generator 1 according to the present invention in this case. FIG. 14A illustrates a relationship between the rpm of the rotor and output electric power (W) of the magneto generator 1 in a case where the generated voltage (Vrout) of the magneto generator 1 is 14 V, 21 V, or 42 V. FIG. 14B illustrates a relationship between the rpm of the rotor and power generation efficiency (%) of the magneto generator 1 in the similar case. It is assumed in FIGS. 14A and 14B that rpm of an intersection between the output characteristic of the generated voltage of 14 V and the output characteristic of the generated voltage of 21 V is αa, and that rpm of an intersection between the output characteristic of the generated voltage of 21 V and the output characteristic of the generated voltage of 42 V is βa. For example, with regard to the power generation characteristics of the magneto generator 1 of FIGS. 14A and 14B, the voltage control unit 5 switches the transformation ratio (Vbin/Vrout) of the DC voltage transformer 40 in the areas n1, n2, and n3 of different rpm to 3, 2, and 1, respectively, and then controls the switched transformation ratio. As a result, charging may be performed in the state where the voltage Vbin between the input terminals of the electrical storage device 2 is set to 42 V. Therefore, compared with the conventionally-performed power generation with the single generated voltage, the output electric power as well as the power generation efficiency may be improved.

Figure 15:
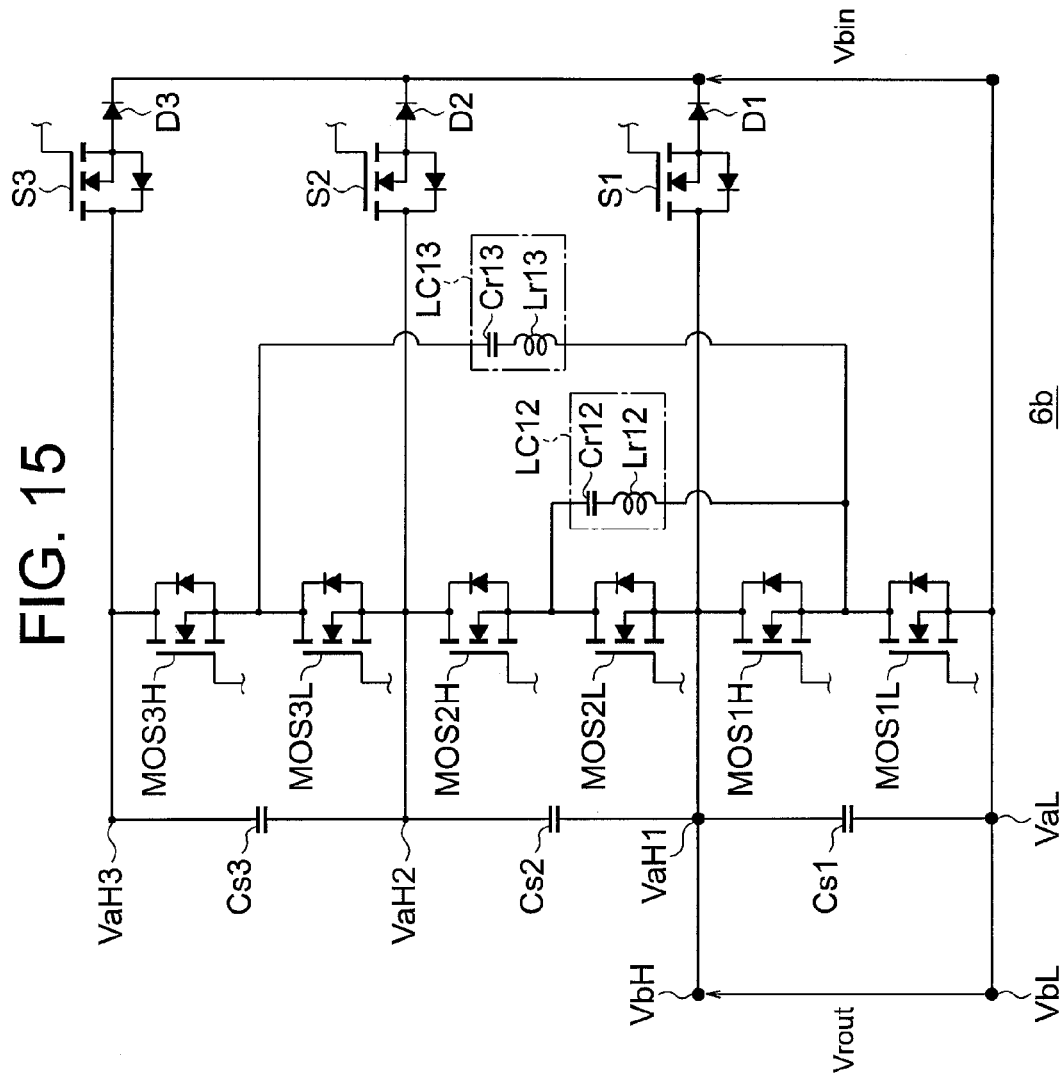
FIG. 15 is a diagram illustrating an example of a step-up circuit forming the DC voltage transformer of the power supply device according to the present invention.

FIG. 15 illustrates an example of a circuit in a case where the DC voltage transformer 40 is formed of a step-up DC/DC power conversion circuit. The circuit of FIG. 15 corresponds to the step-down circuit of FIG. 8, and connection positions of the voltage Vbin between the input terminals and connection positions of the voltage Vrout between the output terminals are replaced with each other. Further, the circuit of FIG. 15 is different in the transistors S1, S2, and S3 and the diodes D1, D2, and D3. Note that the step-up circuit may also be formed by changing the step-down circuit of FIG. 6 in a similar manner.

Next, an operation of the DC/DC power conversion circuit of FIG. 15 is described. The various transistors are controlled by the voltage control unit 5 as described below. When the transistor S1 for switching is turned on and the transistors S2 and S3 for switching are turned off, the DC/DC power conversion circuit operates so that the transformation ratio (Vbin/Vrout) between the voltage Vrout between the output terminals of the rectifying unit 3 and the voltage Vbin between the input terminals of the electrical storage device 2 is 1/1. Further, the DC/DC power conversion circuit operates so that the transformation ratio (Vbin/Vrout) is 2 when the transistor S2 is turned on and the transistors S1 and S3 are turned off, and operates so that the transformation ratio (Vbin/Vrout) is 3 when the transistor S3 is turned on and the transistors S1 and S2 are turned off.

When the transistor S1 is turned on, the transistor S2 is turned off, and the transistor S3 is turned off, the voltage Vrout between the output terminals of the rectifying unit 3 is applied between the terminal VbH and the terminal VbL and is output from the output terminals VaH1 and VaL as the voltage Vbin between the input terminals of the electrical storage device 2 without being transformed.

When the transistor S1 is turned off, the transistor S2 is turned on, and the transistor S3 is turned off, the voltage between the terminals VaH2 and VaL is applied between the input terminals of the electrical storage device 2 as the voltage Vbin. Further, the transistors MOS2H and MOS1H, which are the high-voltage side MOSFETs, and the transistors MOS2L and MOS1L, which are the low-voltage side MOSFETs, are repeatedly turned on and off in an alternating manner with a period substantially equal to a resonance period T of the LC series circuit LC12 and with a duty ratio of about 50%. When the transistors MOS2L and MOS1L, which are the low-voltage side MOSFETs, are both turned on, a part of energy stored in the smoothing capacitor Cs1 is, due to a voltage difference therebetween, shifted to the capacitor Cr12 via the following path.

$$Cs1 \rightarrow MOS2L \rightarrow Cr12 \rightarrow Lr12 \rightarrow MOS1L$$

Next, when the transistors MOS2H and MOS1H, which are the high-voltage side MOSFETs, are both turned on, the energy charged in the capacitor Cr12 is, due to a voltage difference therebetween, shifted to the smoothing capacitor Cs2 via the following path.

$$Cr12 \rightarrow MOS2H \rightarrow Cs2 \rightarrow MOS1H \rightarrow Lr12$$

In this manner, as a result of charging/discharging of the capacitor Cr12, the energy is shifted from the smoothing capacitor Cs1 to the smoothing capacitor Cs2. Then, the voltage Vrout between the output terminals of the rectifying unit 3, which is input between the terminal VbH and the terminal VbL, is stepped up to a voltage two times thereof, and is output as the voltage Vbin between the input terminals of the electrical storage device 2 from the output terminals VaH2 and VaL.

When the transistor S1 is turned off, the transistor S2 is turned off, and the transistor S3 is turned on, the voltage between the terminals VaH3 and VaL is applied between the input terminals of the electrical storage device 2 as the voltage Vbin. The transistors MOS3H, MOS2H, and MOS1H, which are the high-voltage side MOSFETs, and the transistors MOS3L, MOS2L, and MOS1L, which are the low-voltage side MOSFETs, are repeatedly turned on and off in an alternating manner with a period substantially equal to the resonance period T of the LC series circuits LC12 and LC13 and with a duty ratio of about 50%. When the transistors MOS3L, MOS2L, and MOS1L, which are the low-voltage side MOSFETs, are all turned on, a part of energy stored in the smoothing capacitors Cs1 and Cs2 is, due to a voltage difference thereamong, shifted to the capacitors Cr12 and Cr13 via the following paths.

$$Cs1 \rightarrow Cs2 \rightarrow MOS3L \rightarrow Cr13 \rightarrow Lr13 \rightarrow MOS1L$$

$$Cs1 \rightarrow MOS2L \rightarrow Cr12 \rightarrow Lr12 \rightarrow MOS1L$$

Next, when the transistors MOS3H, MOS2H, and MOS1H, which are the high-voltage side MOSFETs, are all turned on, the energy charged in the capacitors Cr12 and Cr13 is, due to a voltage difference thereamong, shifted to the smoothing capacitors Cs2 and Cs3 via the following paths.

$$Cr13 \rightarrow MOS3H \rightarrow Cs3 \rightarrow Cs2 \rightarrow MOS1H \rightarrow Lr13$$

$$Cr12 \rightarrow MOS2H \rightarrow Cs2 \rightarrow MOS1H \rightarrow Lr12$$

In this manner, as a result of charging/discharging of the capacitors Cr12 and Cr13, the energy is shifted from the smoothing capacitors Cs1 and Cs2 to the smoothing capacitors Cs2 and Cs3. Then, the voltage Vrout between the output terminals of the rectifying unit 3, which is input between the terminal VbH and the terminal VbL, is stepped up to a voltage three times thereof, and is output as the voltage Vbin between the input terminals of the electrical storage device 2 from the output terminals VaH3 and VaL.

The power supply device according to the present invention transforms a voltage by the DC voltage transformer in accordance with a voltage of an electrical load formed of, for example, an electrical storage device (battery), to thereby obtain an output current higher than that of the conventional one. In addition, a voltage is transformed by the DC voltage transformer in accordance with the voltage of the electrical load, and hence a generated current may be suppressed. Then, input torque (input energy) from the torque supplying device is suppressed, which enables a reduction in load of the torque supplying device.

In each of the first to sixth embodiments described above, the case where the electrical load is the electrical storage device (battery) has been described. In the following embodiments, a case where the electrical load is an electrical load device, whose electrical load amount (such as consumption power amount) particularly varies, is described.

Seventh Embodiment

Figure 16:
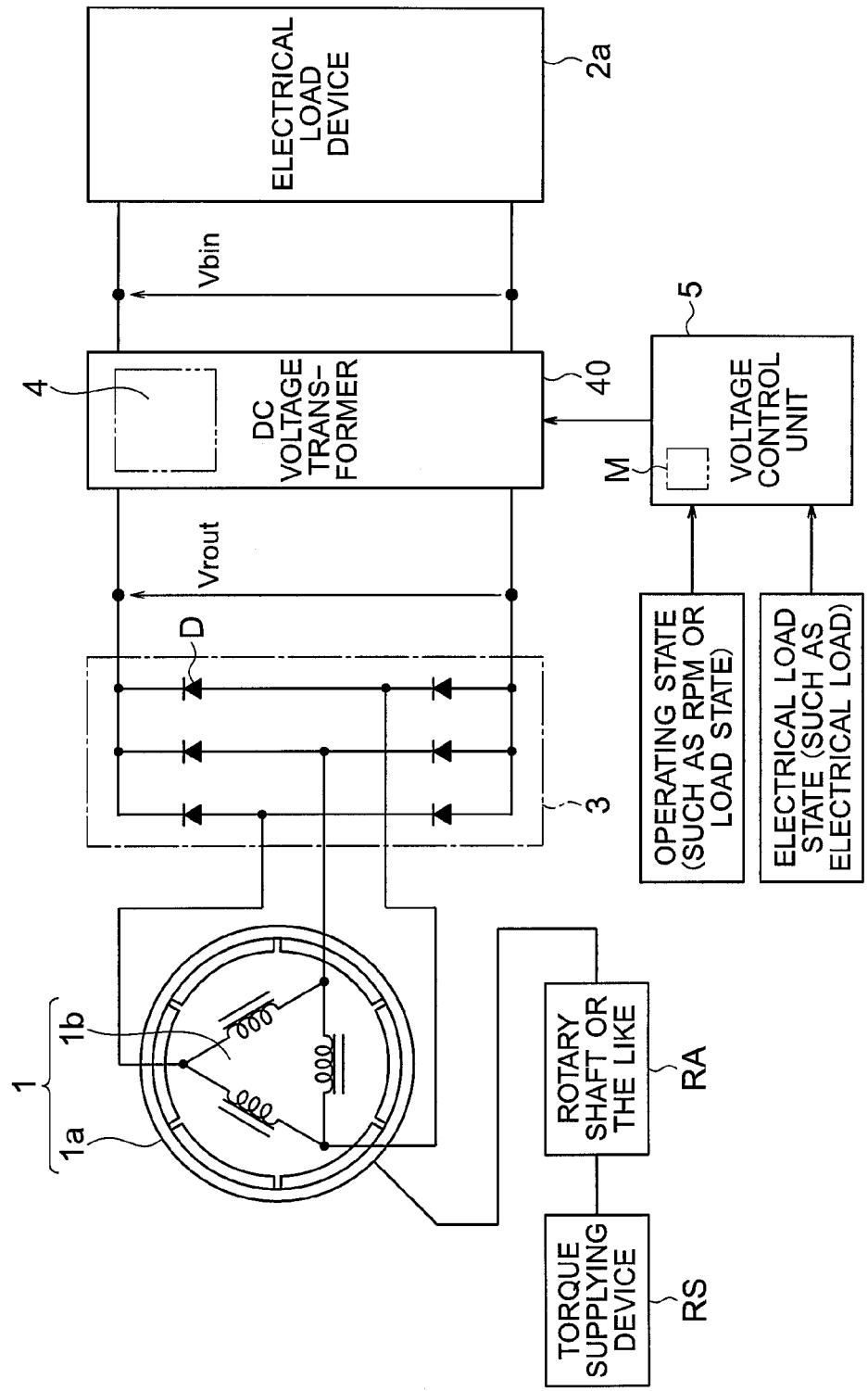
FIG. 16 is a diagram illustrating an overall structure of a power supply device according to a seventh embodiment of the present invention.

FIG. 16 is a diagram illustrating an overall structure of a power supply device according to a seventh embodiment of the present invention. The similar or corresponding portions to those of the embodiments described above are denoted by the same reference symbols, and detailed description thereof is omitted. An electrical load device 2a as the electrical load is supplied with electric power generated by the magneto generator 1.

The DC voltage transformer 40 is formed of the step-down non-isolated DC/DC power conversion circuit 4 illustrated in FIG. 2. The DC/DC power conversion circuit 4 transforms the voltage Vrout between the output terminals of the rectifying unit 3 to the voltage Vbin between input terminals of the electrical load device 2a, and then supplies the voltage Vbin to the electrical load device 2a. The transformation ratio (Vbin/Vrout) on this occasion is controlled by the voltage control unit 5 in accordance with a signal indicating the operating state of the rotor 1a such as the rpm, and a signal indicating an electrical load state of the electrical load device 2a formed of, for example, a sensor or an electronic device. Note that, in the case where the voltage control unit 5 has the function of considering the operating load state of the torque supplying device RS as described in the sixth embodiment, the signal indicating the operating state includes a signal indicating the operating load state of the torque supplying device (the same shall apply hereinafter).

Figure 17A:
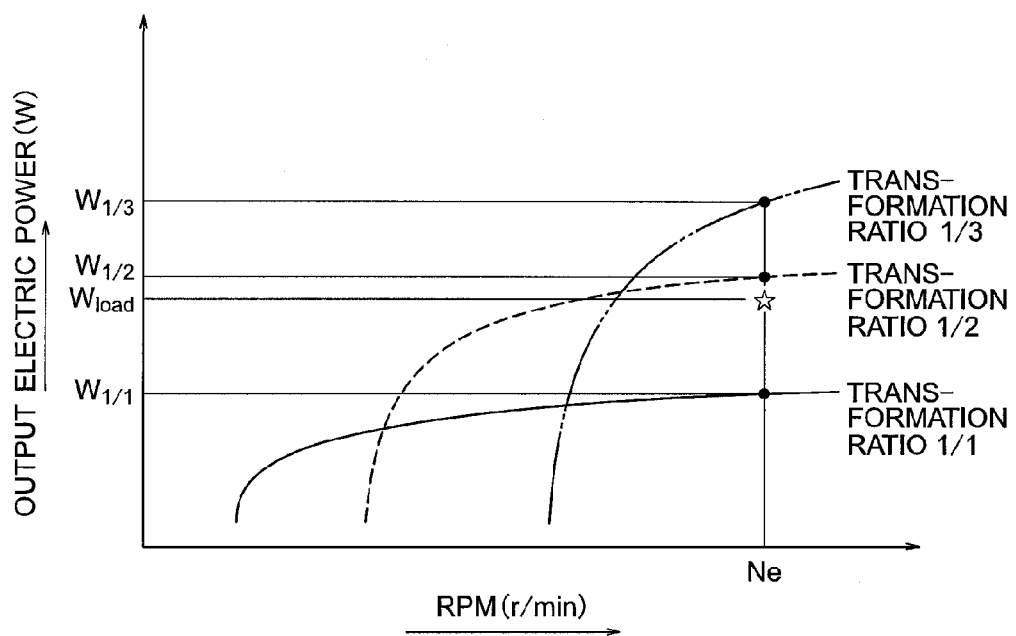
FIG. 17A is a graph illustrating a relationship between a transformation ratio and output electric power with respect to rpm of a magneto generator according to the seventh and other embodiments of the present invention.
Figure 17B:
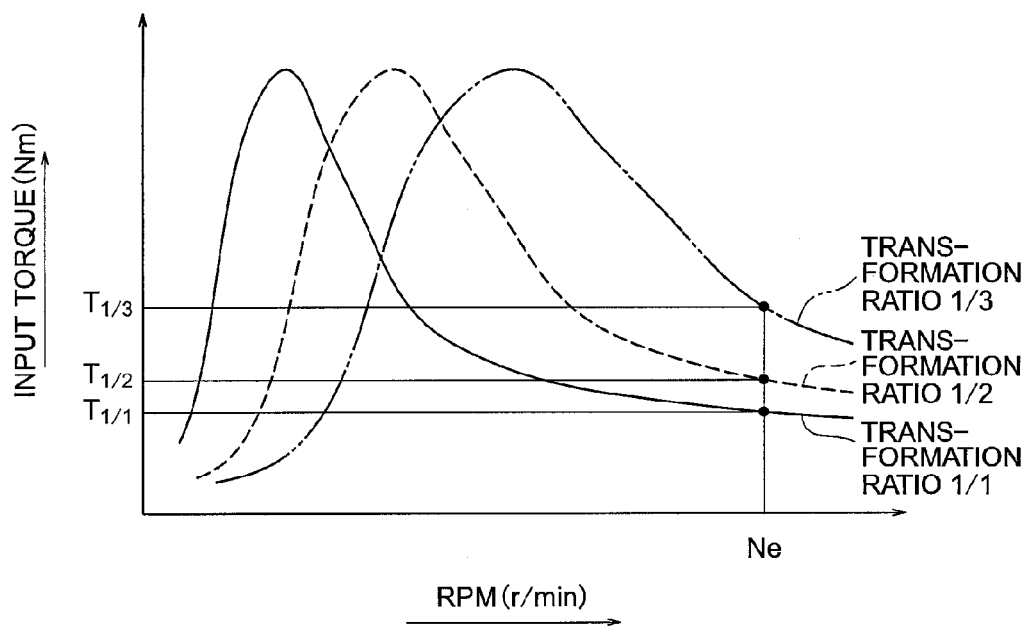
FIG. 17B is a graph illustrating a relationship between the transformation ratio and input torque with respect to the rpm of the magneto generator according to the seventh and other embodiments of the present invention.

FIGS. 17A and 17B illustrate power generation characteristics of the magneto generator 1 according to the seventh embodiment of the present invention. FIG. 17A illustrates a relationship between the rpm of the rotor 1a and output electric power (W) of the magneto generator 1 in a case where the transformation ratio of the DC voltage transformer 40 is 1/3, 1/2, or 1/1. FIG. 17B illustrates a relationship between the rpm of the rotor 1a and input torque to the magneto generator 1 in the similar case.

As illustrated in FIGS. 17A and 17B, in a case where consumption power as the electrical load of the electrical load device 2a consumed when the rpm of the rotor 1a is Ne is represented by Wload, output electric power $W_{1/2}$ equal to or larger than the consumption power Wload of the electrical load device 2a may be supplied at the transformation ratio of 1/2. In this case, compared with the case of the transformation ratio of 1/3, the input torque supplied to the rotor 1a from the torque supplying device RS is small. That is, compared with the case of the transformation ratio of 1/1, the output electric power corresponding to the shortage with respect to the consumption power Wload may be supplied, while the input torque may be suppressed compared with the larger input torque at the transformation ratio of 1/3. Accordingly, energy necessary for rotating the rotor 1a for power generation may be suppressed. Therefore, necessary electric power may be obtained while suppressing the load on the torque supplying device, which improves power generation efficiency compared with that of the conventional power supply device. In a case where the torque supplying device is an internal combustion engine, fuel efficiency and the like may be improved.

Note that, in order to realize the above-mentioned operation, as to the magneto generator 1, the relationship among the rpm (r/min) of the rotor, the output electric power (W) of the magneto generator, and the transformation ratio, and the relationship among the rpm (r/min) of the rotor, the input torque (Nm) to the magneto generator, and the transformation ratio, which are respectively illustrated in FIGS. 17A and 17B, are obtained in advance through measurement or the like, and stored in advance as control information in the memory M of the voltage control unit 5 in the form of a table. The signal indicating the rpm of the rotor and the signal indicating the electrical load state of the electrical load device 2a (such as the consumption power signal indicating the consumption power Wload) are input to the voltage control unit 5 as the operating state signal and the electrical load state signal, respectively. Then, in accordance with the table, the voltage control unit 5 determines the transformation ratio at which the consumption power Wload of the electrical load device 2a may be supplied and the input torque supplied to the rotor 1a from the torque supplying device RS is smaller. The voltage control unit 5 controls a switch of the transistor MOS0 of the non-isolated DC/DC power conversion circuit 4 of the DC voltage transformer 40 illustrated in FIG. 2 so as to obtain the determined transformation ratio. This control is periodically performed based on, for example, a predetermined unit control period.

Further, in the case where hysteresis is provided to the above-mentioned timing at which the transformation ratio is switched, for example, a shift amount of the transformation ratio switching point between when the rpm increases and when the rpm decreases is defined in advance as the rpm amount (see FIG. 4), and stored in the memory M of the voltage control unit 5. The voltage control unit 5 continuously stores the rpm at the latest transformation ratio switching. When the rpm is switched between the increase and the decrease and when the transformation ratio switching needs to be performed, the voltage control unit 5 switches the transformation ratio at a timing when the rpm reaches rpm determined by adding/subtracting the above-mentioned shift amount to/from the stored rpm at the transformation ratio switching.

Note that, as the signal indicating the electrical load state of the electrical load device 2a, the voltage control unit 5 may directly receive a signal indicating the consumption power of the electrical load device 2a. Alternatively, the voltage control unit 5 may receive a signal indicating the electrical load state, such as the operating state signal, and then the signal may be converted into the consumption power in accordance with, for example, a conversion table stored in advance in the memory M.

Eighth Embodiment

Figure 18:
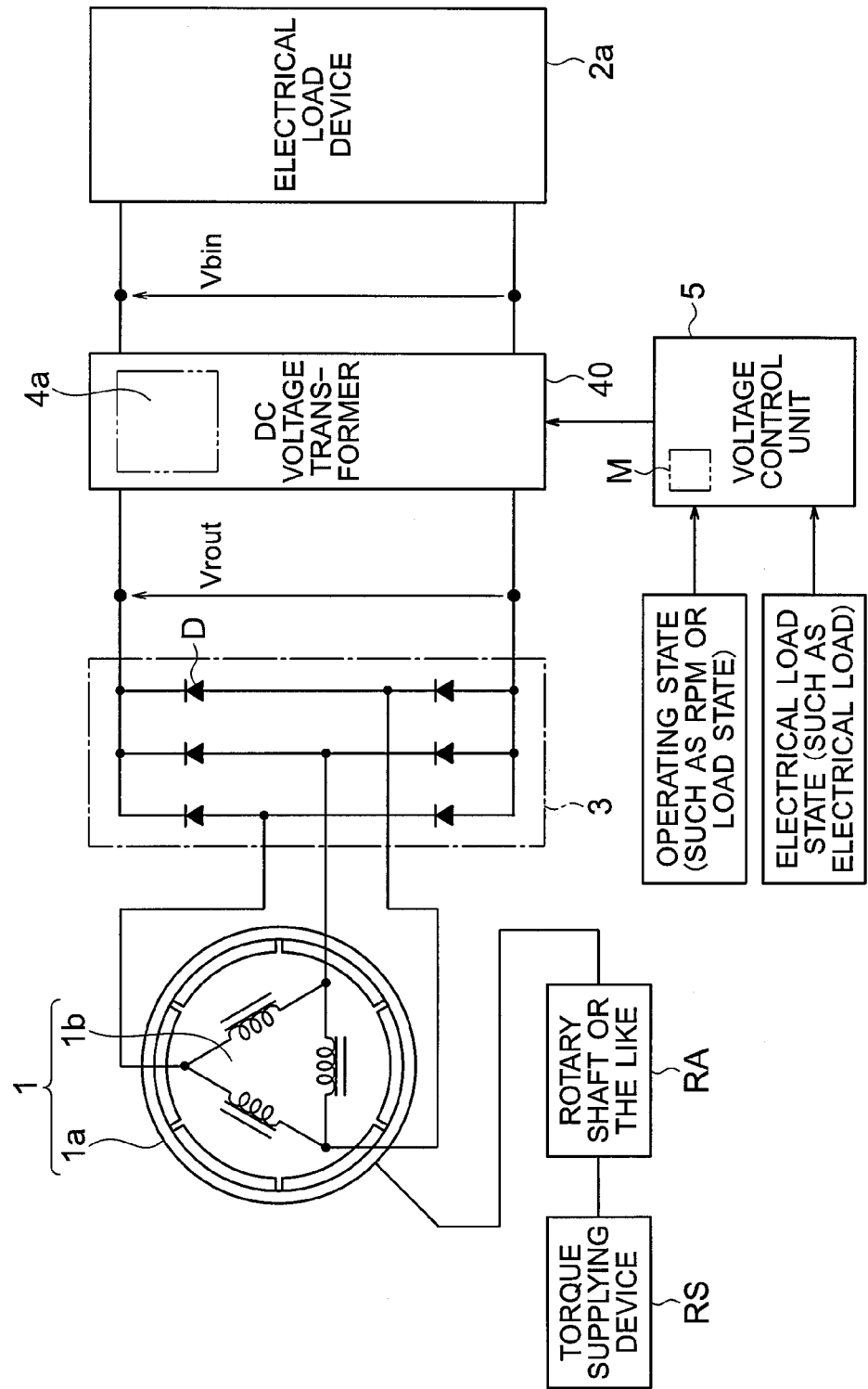
FIG. 18 is a diagram illustrating an overall structure of a power supply device according to an eighth embodiment of the present invention.

FIG. 18 is a diagram illustrating an overall structure of a power supply device according to an eighth embodiment of the present invention. In the power supply device of FIG. 18, the circuit 4a of the DC voltage transformer 40 for changing the transformation ratio (Vbin/Vrout) between the voltage Vbin between the input terminals of the electrical load device 2a and the voltage Vrout between the output terminals of the rectifying unit 3 is formed of the DC/DC power conversion circuit capable of transforming voltage in a plurality of steps illustrated in FIG. 6.

The DC/DC power conversion circuit 4a capable of transforming voltage in a plurality of steps transforms the voltage Vrout between the output terminals of the rectifying unit 3 to the voltage Vbin between the input terminals of the electrical load device 2a, and then supplies the voltage Vbin to the electrical load device 2a. The transformation ratio (Vbin/Vrout) on this occasion is controlled by the voltage control unit 5 in accordance with the operating state signal of the rotor 1a such as an rpm signal, and the electrical load state signal of the electrical load device 2a such as a consumption power signal. The transformation ratio switching operation of the DC/DC power conversion circuit 4a controlled by the voltage control unit 5 is identical with that described above with reference to FIG. 6.

Similarly to the power supply device according to the seventh embodiment described above, as illustrated in FIGS. 17A and 17B, at the transformation ratio of 1/2, the output electric power $W_{1/2}$ equal to or larger than the consumption power Wload of the electrical load device may be supplied, and compared with the case of the transformation ratio of 1/3, the input torque supplied to the rotor 1a from the torque supplying device RS is small. That is, compared with the case of the transformation ratio of 1/1, the output electric power corresponding to the shortage with respect to the consumption power Wload may be supplied, while the input torque may be suppressed compared with the larger input torque at the transformation ratio of 1/3. Accordingly, energy necessary for rotating the rotor 1a for power generation may be suppressed. Therefore, necessary electric power may be obtained while suppressing the load on the torque supplying device, which improves power generation efficiency compared with that of the conventional power supply device. In a case where the torque supplying device is an internal combustion engine, fuel efficiency and the like may be improved.

Further, as described above, compared with the circuit illustrated in FIG. 2, the voltage applied to each portion is divided into one third thereof, and hence a circuit element with a lower withstand voltage may be selected. Accordingly, a size, weight, and cost of the DC voltage transformer 40 may be reduced.

Figure 19:
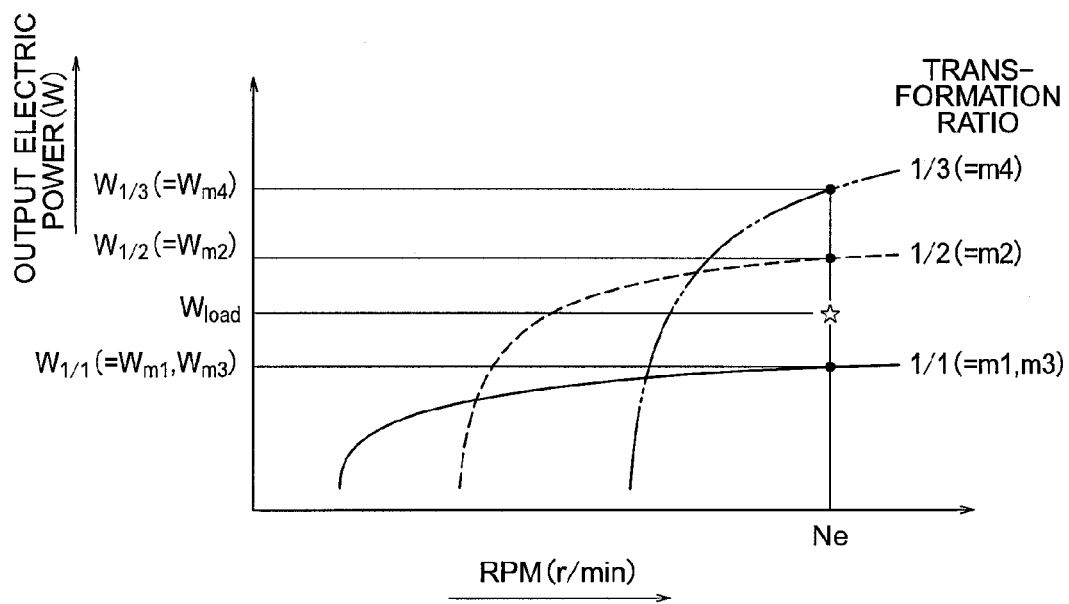
FIG. 19 is a graph illustrating a relationship between a transformation ratio and output electric power with respect to rpm of a magneto generator according to the eighth embodiment of the present invention.
Figure 20:
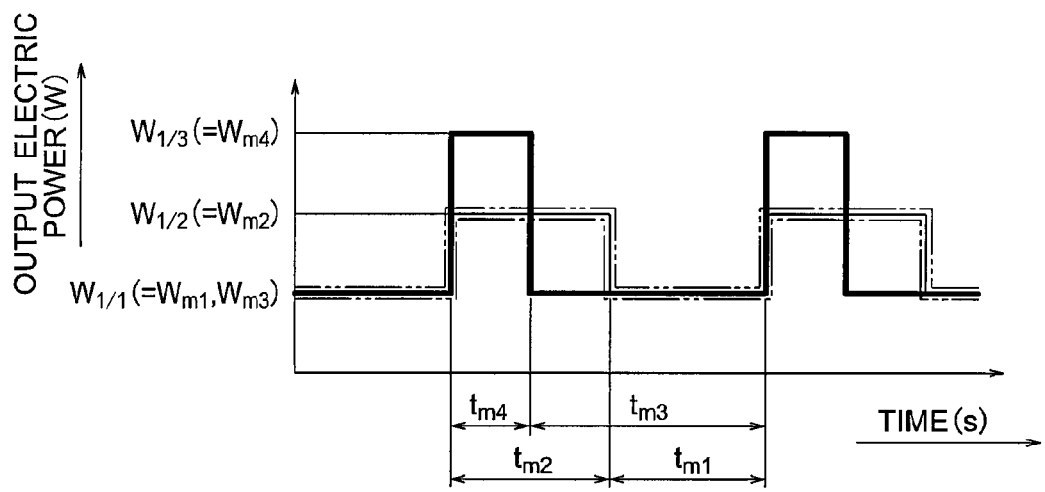
FIG. 20 is a graph illustrating a change in output electric power of the magneto generator with elapsed time according to the eighth embodiment of the present invention.
Figure 21:
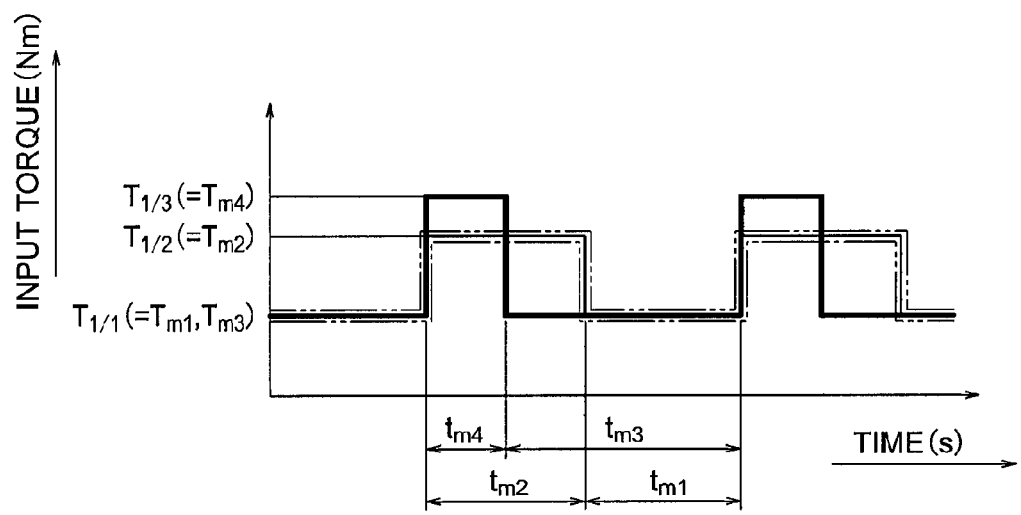
FIG. 21 is a graph illustrating a change in input torque to the magneto generator with the elapsed time according to the eighth embodiment of the present invention.

Subsequently, referring to FIGS. 19 to 21, other examples of the control performed by the voltage control unit 5 according to the eighth embodiment are described. FIG. 19 illustrates a relationship between the rpm (r/min) of the rotor 1a and output electric power (W) of the magneto generator 1, FIG. 20 illustrates a change in output electric power (W) of the magneto generator 1 with elapsed time (s), and FIG. 21 illustrates a change in input torque (Nm) to the magneto generator 1 with the elapsed time (s), in a case where the transformation ratio of the DC voltage transformer 40 is 1/3, 1/2, or 1/1. Consumption power of the electrical load device 2a consumed when the rpm is Ne is represented by Wload, and the output electric power of the magneto generator 1 in the case where the transformation ratios are 1/3, 1/2, and 1/1 is represented by $W_{1/3}$, $W_{1/2}$, and $W_{1/1}$, respectively.

The voltage control unit 5 controls the respective operating time periods (current supply time periods tm1 and tm2; actually, time ratio within a unit control period) at the transformation ratios m1 and m2 so that the following expression may be satisfied, $$W\text{load} \leq Wm1 \times tm1/(tm1+tm2) + Wm2 \times tm2/(tm1+tm2)$$

where m1 and m2 represent the transformation ratios of 1/1 and 1/2, respectively; Wm1 ($=W_{1/1}$), the output electric power at the transformation ratio m1; tm1, a current supply time period; Wm2 ($=W_{1/2}$), the output electric power at the transformation ratio m2; and tm2, a current supply time period, and (tm1+tm2) expresses a predetermined unit control period.

Through this control, output electric power necessary for at least the consumption power of the electrical load device 2a may be supplied. In addition, compared with the case of the fixed transformation ratio of 1/2 or 1/3, the input torque input to the magneto generator 1 from the torque supplying device RS may be suppressed. That is, energy necessary for rotating the rotor 1a for power generation may be suppressed to improve power generation efficiency compared with that of the conventional power supply device.

Further, the operation at the transformation ratios m1 (=1/1) and m2 (=1/2) is switched to the operation at the transformation ratios m3 (=1/1) and m4 (1/3) in a case where the following expression is satisfied, $$W\text{load} \leq Wm3 \times tm3/(tm3+tm4) + Wm4 \times tm4/(tm3+tm4)$$

where m3 and m4 represent the transformation ratios of 1/1 and 1/3, respectively; Wm3 ($=W_{1/1}$), the output electric power at the transformation ratio m3; tm3, a current supply time period; Wm4 ($=W_{1/3}$), the output electric power at the transformation ratio m4; and tm4, a current supply time period, and (tm3+tm4) expresses the predetermined unit control period described above, and in a case where the following expression is satisfied, $$Tm1 \times tm1/(tm1+tm2) + Tm2 \times tm2/(tm1+tm2) > Tm3 \times tm3/(tm3+tm4) + Tm4 \times tm4/(tm3+tm4)$$

where Tm1 ($=T_{1/1}$), Tm2 ($=T_{1/2}$), Tm3 ($=T_{1/1}$), and Tm4 ($=T_{1/3}$) represent the input torque input to the magneto generator 1 from the torque supplying device RS at the transformation ratios m1, m2, m3, and m4, respectively.

Through this switching, the input torque may be further suppressed. That is, energy necessary for rotating the rotor 1a for power generation may be further suppressed to further improve power generation efficiency.

Further, the operation at the transformation ratios m1 (=1/1) and m2 (=1/2) is switched to the operation at the transformation ratios m3 (=1/1) and m4 (=1/3) to suppress the fluctuation in input torque at the transformation ratio switching when the following expression is satisfied.

$$|Tm1-Tm2| > |Tm3-Tm4|$$

This switching enables a further reduction in load of the torque supplying device, and in a case where the torque supplying device is an internal combustion engine, there may be obtained an effect of suppressing the fluctuation in rotation to improve the drivability. Note that, in the case of a combination of the transformation ratios m1=1/1, m2=1/2, m3=1/1, and m4=1/3 as illustrated in FIG. 21, the following expression is satisfied.

$$|Tm1-Tm2|<|Tm3-Tm4|$$

Therefore, the fluctuation in input torque is smaller in the case where the operation at the transformation ratios m1 and m2 continues without being switched to the operation at the transformation ratios m3 and m4.

Further, the operation at the transformation ratios m1 (=1/1) and m2 (1/2) is switched to the operation at the transformation ratios m3 (=1/1) and m4 (=1/3) to suppress the fluctuation in output electric power at the transformation ratio switching when the following expression is satisfied.

$$|Wm1-Wm2|>|Wm3-Wm4|$$

That is, the fluctuation in current supplied to the electrical load device may be suppressed. As a result, a malfunction due to the voltage fluctuation of the electrical load device may be suppressed, and radio wave noise as a result of the fluctuation in excessive current may be suppressed as well, which enables a malfunction of other electronic devices to be suppressed. Note that, in the case of the combination of the transformation ratios m1=1/1, m2=1/2, m3=1/1, and m4=1/3 as illustrated in FIG. 21, the following expression is satisfied.

$$|Wm1-Wm2|<|Wm3-Wm4|$$

Therefore, the fluctuation in output electric power is smaller in the case where the operation at the transformation ratios m1 and m2 continues without being switched to the operation at the transformation ratios m3 and m4.

Note that, in order to realize the above-mentioned operation, similarly to the embodiments described above, the relationship between the rpm (r/min) of the rotor 1a and the output electric power (W) of the magneto generator 1 regarding the transformation ratio and the magneto generator 1, and the relationship among the transformation ratio, the rpm (r/min) of the rotor 1a, and the input torque (Nm) to the magneto generator 1, which are respectively illustrated in FIGS. 17A and 17B, are obtained in advance through measurement or the like, and stored in advance as control information in the memory M of the voltage control unit 5 in the form of a table. When the rpm signal of the rotor and the signal indicating the electrical load state of the electrical load device 2a are input to the voltage control unit 5, the voltage control unit 5 determines the transformation ratio and the transformation ratio switching timing in accordance with the above-mentioned table and processing. Then, based on the determined transformation ratio and the determined transformation ratio switching timing, the voltage control unit 5 performs switch control of the respective transistors of the non-isolated DC/DC power conversion circuit of the DC voltage transformer 40.

Figure 22:
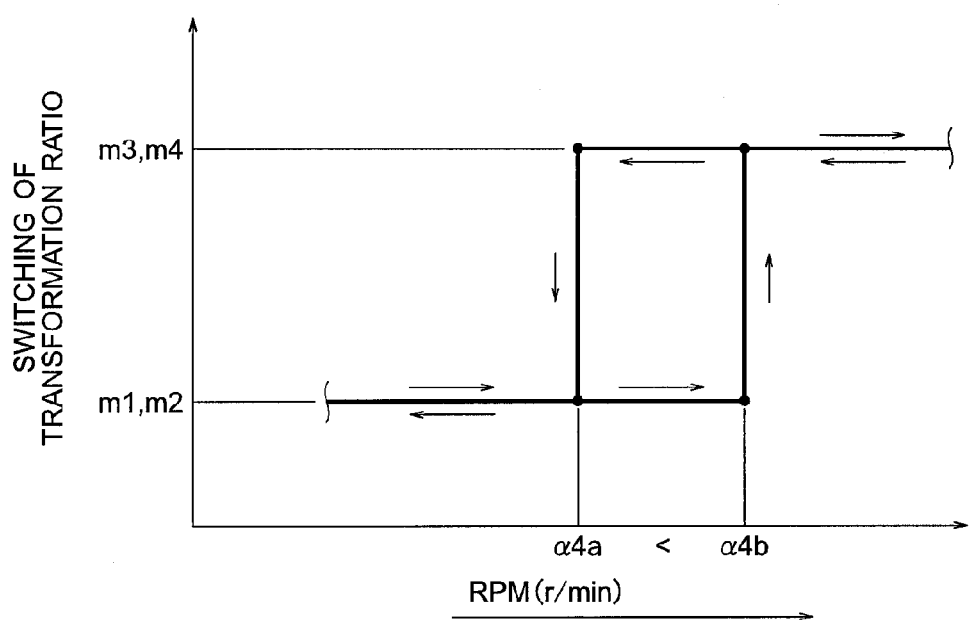
FIG. 22 is a graph illustrating a relationship between the rpm and a timing at which the transformation ratio is switched according to the eighth embodiment of the present invention.

Further, in the case where hysteresis is provided to the above-mentioned timing at which the transformation ratio is switched, the same control as described in the seventh embodiment is added. Through the control, for example, as illustrated in FIG. 22, the hysteresis may be provided to the switching between the operation at the transformation ratios m1 (=1/1) and m2 (1/2) and the operation at the transformation ratios m3 (=1/1) and m4 (1/3).

Ninth Embodiment

Figure 23:
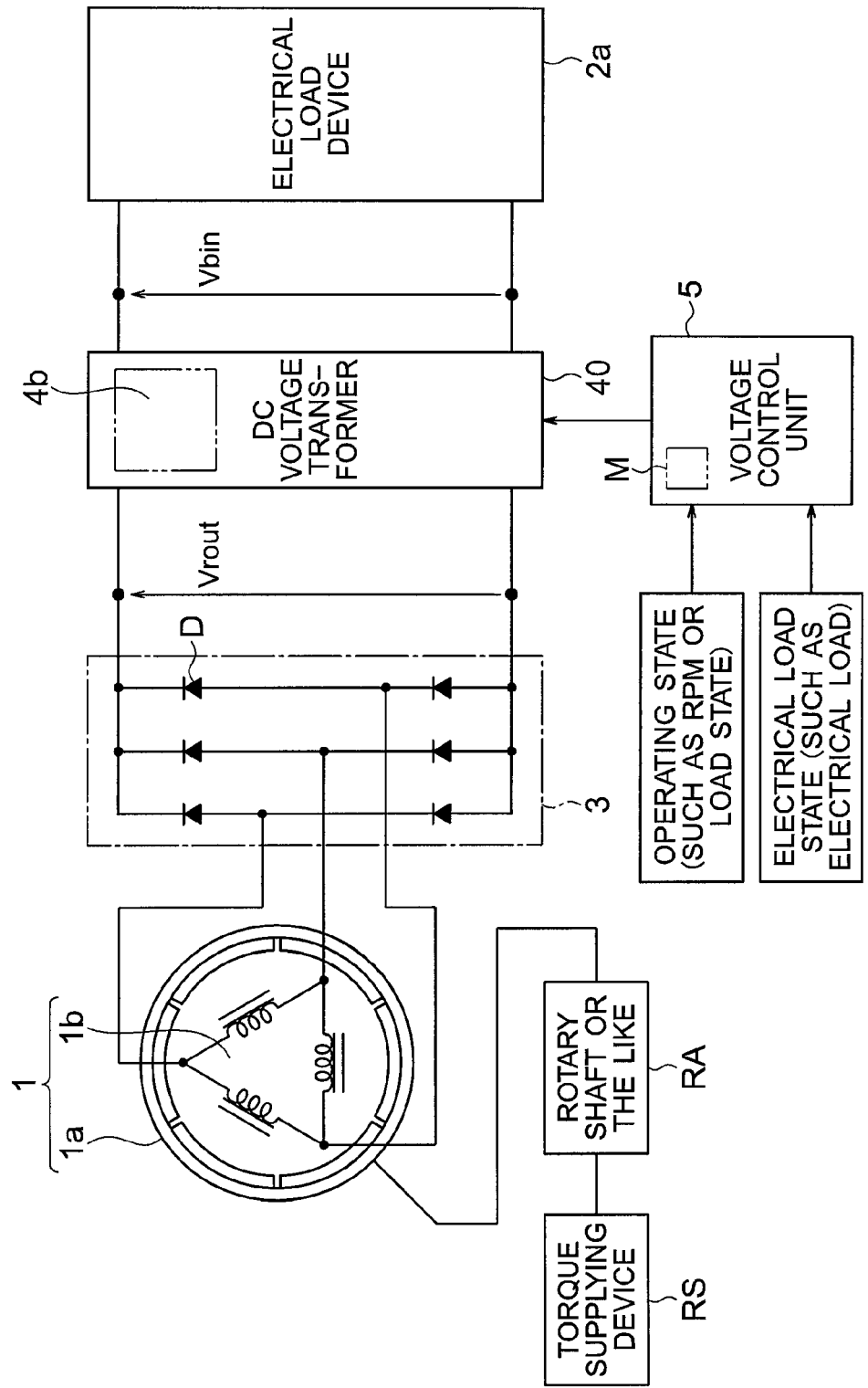
FIG. 23 is a diagram illustrating an overall structure of a power supply device according to a ninth embodiment of the present invention.

FIG. 23 is a diagram illustrating an overall structure of a power supply device according to a ninth embodiment of the present invention. In the power supply device of FIG. 23, the circuit 4b of the DC voltage transformer 40 for changing the transformation ratio (Vbin/Vrout) between the voltage Vbin between the input terminals of the electrical load device 2a and the voltage Vrout between the output terminals of the rectifying unit 3 is formed of the DC/DC power conversion circuit capable of transforming voltage in a plurality of steps illustrated in FIG. 8.

The DC/DC power conversion circuit 4b capable of transforming voltage in a plurality of steps transforms the voltage Vrout between the output terminals of the rectifying unit 3 to the voltage Vbin between the input terminals of the electrical load device 2a, and then supplies the voltage Vbin to the electrical load device 2a. The transformation ratio (Vbin/Vrout) on this occasion is controlled by the voltage control unit 5 in accordance with the operating state signal of the rotor 1a such as an rpm signal, and the electrical load state signal of the electrical load device 2a such as a consumption power signal. The transformation ratio switching operation of the DC/DC power conversion circuit 4b controlled by the voltage control unit 5 is identical with that described above with reference to FIG. 8. In addition, the control operation of the voltage control unit 5 is identical with those described in the seventh and eighth embodiments (including other control examples of the eighth embodiment) described above.

With the structure described above, the effect described in the above-mentioned third embodiment can be obtained in the power supply device according to each of the seventh and eighth embodiments described above.

Tenth Embodiment

Figure 24:
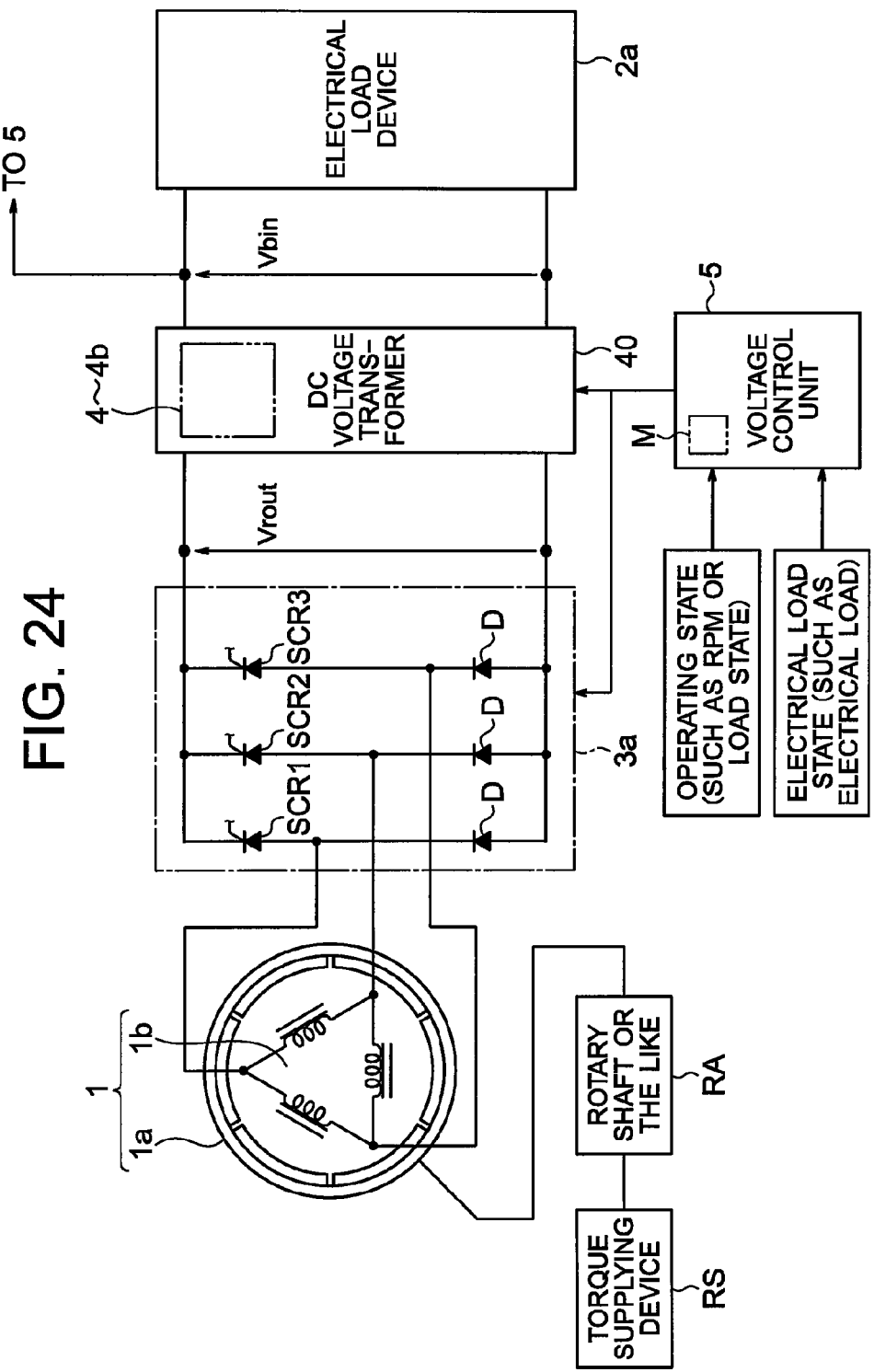
FIG. 24 is a diagram illustrating an example of an overall structure of a power supply device according to a tenth embodiment of the present invention.

FIG. 24 is a diagram illustrating an overall structure of a power supply device according to a tenth embodiment of the present invention. The power supply device of FIG. 24 is different from those of the above-mentioned embodiments in a structure of the rectifying unit 3a. Further, the circuit of the DC voltage transformer 40 may be formed of the DC/DC power conversion circuit 4, 4a, or 4b according to any one of the embodiments described above. Output electric power control is performed based on the transformation ratio control described in any one of the seventh to ninth embodiments.

Similarly to FIG. 9 of the fourth embodiment, a three-phase diode bridge provided in the rectifying unit 3a is formed of diodes D which are provided on a negative wave side and of thyristors SCR1, SCR2, and SCR3 (opening means) which are provided in place of diodes on a positive wave side. In a case where the voltage Vbin between the input terminals of the electrical load device 2a (or output voltage of the DC voltage transformer 40) is equal to or larger than a predetermined value, respective gate signals of the thyristors SCR1, SCR2, and SCR3 are turned off so that electrical conduction from the rectifying unit 3a to the DC voltage transformer 40 may be interrupted to open the output terminals of the magneto generator 1. On the other hand, in a case where the voltage Vbin between the input terminals of the electrical load device 2a is less than the predetermined value, the respective gate signals of the thyristors SCR1, SCR2, and SCR3 are turned on so that electrical conduction may be provided from the rectifying unit 3a to the DC voltage transformer 40. In this manner, the voltage Vbin between the input terminals of the electrical load device 2a is adjusted to the predetermined value.

Note that, in order that the rectifying unit 3a may have the function described above, the voltage control unit 5 detects the voltage Vbin between the input terminals of the electrical load device 2a or the output voltage of the DC voltage transformer 40 by using a voltage detector (not shown), and changes the respective gate signals of the thyristors SCR1, SCR2, and SCR3 in accordance with a comparison result between the detected voltage and the predetermined value as a control target (whether the detected voltage is equal to or larger than, or less than the predetermined value). For the purpose of this, the voltage control unit 5 stores the above-mentioned predetermined value as the control target in the memory M as control information.

Note that the thyristors SCR1, SCR2, and SCR3 together form the opening means for interrupting (opening) the electrical conduction from the rectifying unit 3a to the DC voltage transformer 40 so that the output of the magneto generator 1 may be opened. Further, the opening means and the voltage control unit 5 together form output control means.

According to the power supply device of this embodiment, an amount of current supply to the electrical load device 2a may be adjusted without changing the rpm of the rotor 1a in a case where the electrical load device 2a is supplied with an excessive current.

Figure 25:
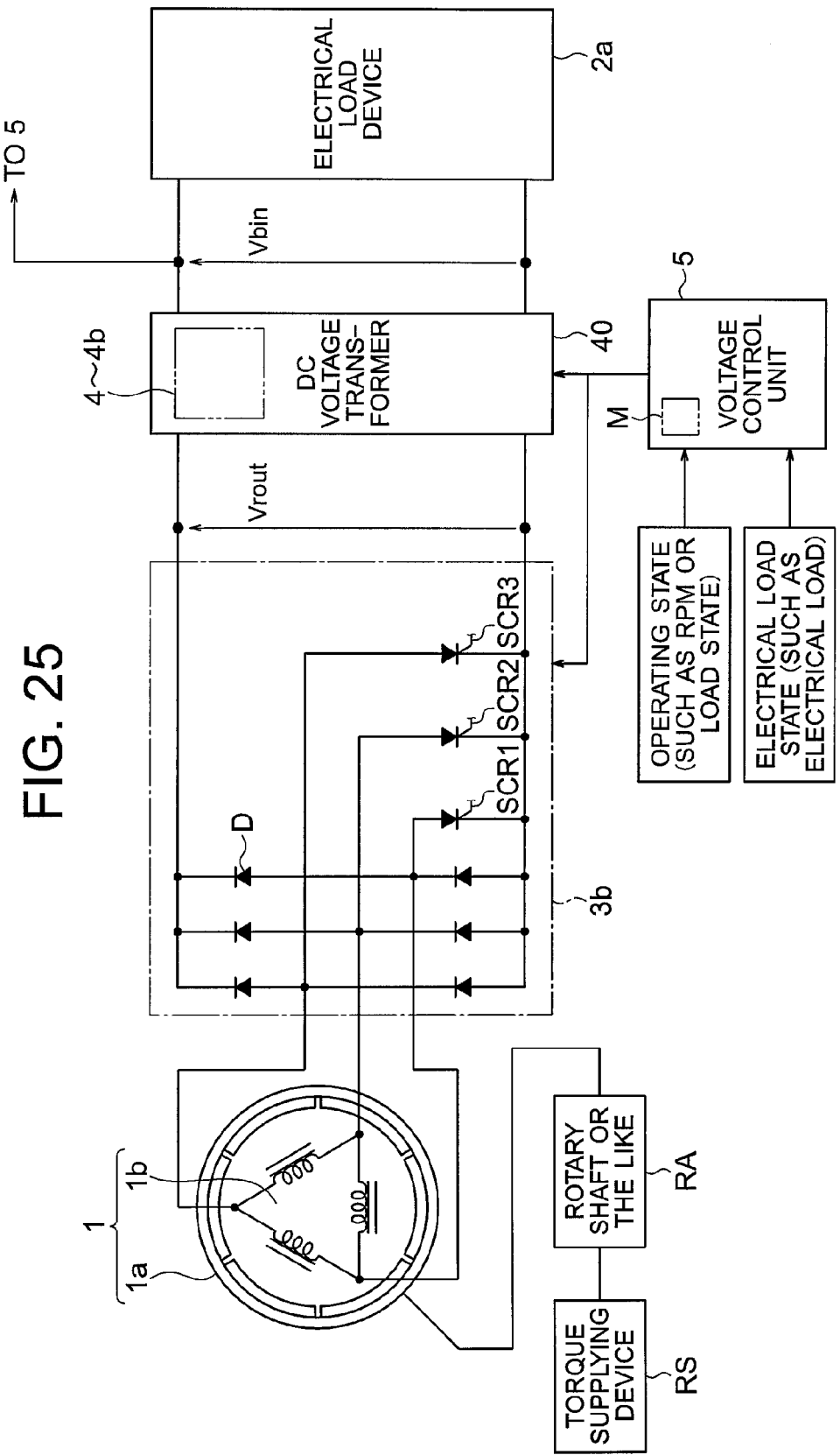
FIG. 25 is a diagram illustrating another example of the overall structure of the power supply device according to the tenth embodiment of the present invention.

Note that the rectifying unit 3b may be provided in place of the rectifying unit 3a as illustrated in FIG. 25. The voltage Vbin between the input terminals of the electrical load device 2a may be adjusted to a predetermined value with the following structure. Similarly to FIG. 10 of the fifth embodiment, in the three-phase diode bridge provided in the rectifying unit 3b, between the respective input terminals for three phases which receive input from the magneto generator 1 and the anode terminals of the diodes D on the negative wave side, the thyristors SCR1, SCR2, and SCR3 (short-circuiting means) are provided with the direction from the respective input terminals for three phases to the anode terminals of the diodes D on the negative wave side being as a forward direction. In the case where the voltage Vbin between the input terminals of the electrical load device 2a (or output voltage of the DC voltage transformer 40) is equal to or larger than the predetermined value, the respective gate signals of the thyristors SCR1, SCR2, and SCR3 are turned on so that the output end of the magneto generator 1 may be electrically short-circuited (returned). On the other hand, in the case where the voltage Vbin between the input terminals of the electrical load device 2a is less than the predetermined value, the respective gate signals of the thyristors SCR1, SCR2, and SCR3 are turned off so that the direct current may be supplied to the DC voltage transformer 40 via the three-phase diode bridge provided in the rectifying unit 3b.

Note that, in order that the rectifying unit 3b may have the function described above, the voltage control unit 5 detects the voltage Vbin between the input terminals of the electrical load device 2a or the output voltage of the DC voltage transformer 40 by using a voltage detector (not shown), and changes the respective gate signals of the thyristors SCR1, SCR2, and SCR3 in accordance with a comparison result between the detected voltage and the predetermined value as a control target (whether the detected voltage is equal to or larger than, or less than the predetermined value). For the purpose of this, the voltage control unit 5 stores the above-mentioned predetermined value as the control target in the memory M as control information.

Note that the thyristors SCR1, SCR2, and SCR3 together form the short-circuiting means for short-circuiting the output of the magneto generator 1. Further, the short-circuiting means and the voltage control unit 5 together form output control means.

Figure 26:
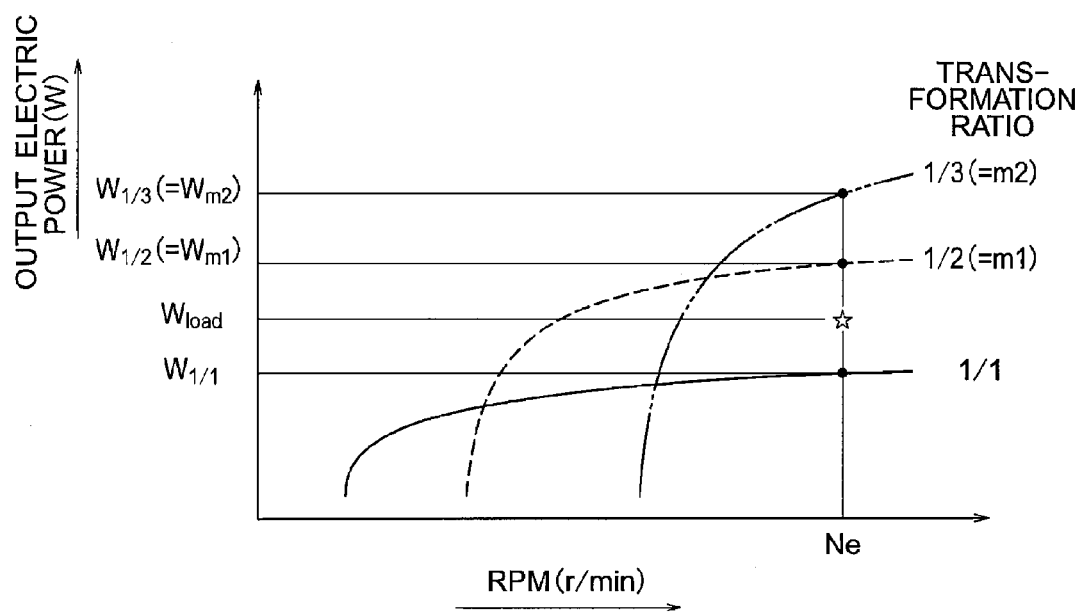
FIG. 26 is a graph illustrating a relationship between a transformation ratio and output electric power with respect to rpm of a magneto generator according to the tenth embodiment of the present invention.
Figure 27:
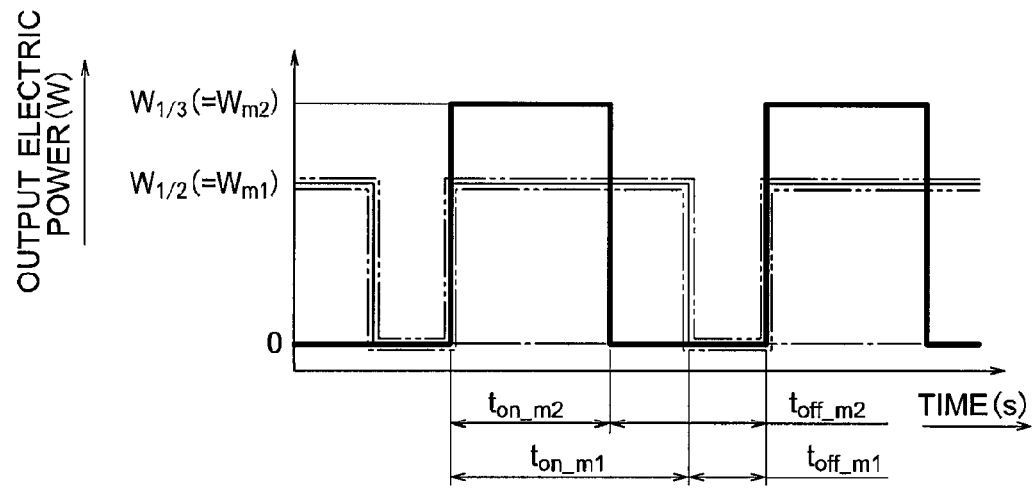
FIG. 27 is a graph illustrating a change in output electric power of the magneto generator with elapsed time according to the tenth embodiment of the present invention.
Figure 28:
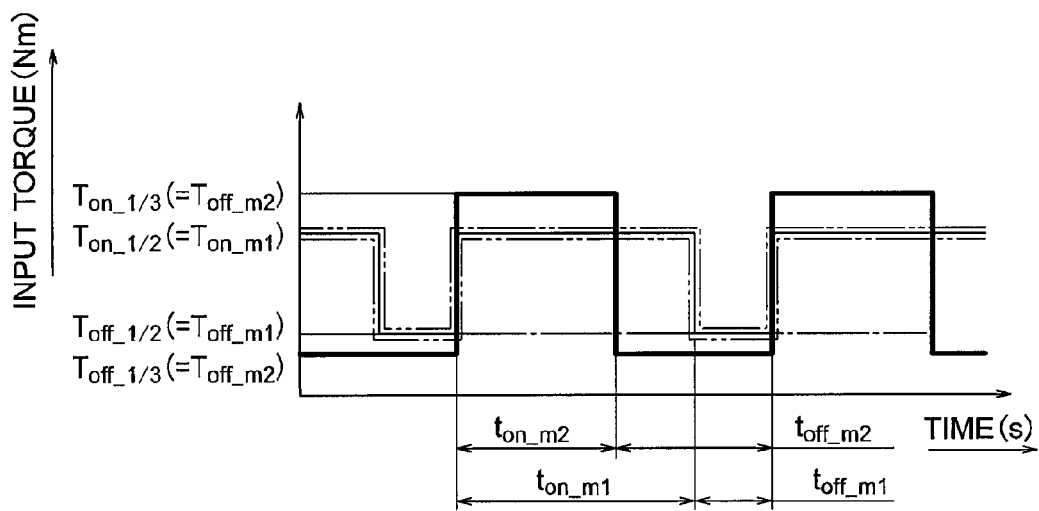
FIG. 28 is a graph illustrating a change in input torque to the magneto generator with the elapsed time according to the tenth embodiment of the present invention.

Subsequently, referring to FIGS. 26 to 28, other examples of the control performed by the voltage control unit 5 according to the tenth embodiment are described. FIG. 26 illustrates a relationship between the rpm (r/min) of the rotor 1a and output electric power (W) of the magneto generator 1, FIG. 27 illustrates a change in output electric power (W) of the magneto generator 1 with elapsed time (s), and FIG. 28 illustrates a change in input torque (Nm) to the magneto generator 1 with the elapsed time (s), in a case where the transformation ratio of the DC voltage transformer 40 is 1/3, 1/2, or 1/1. Consumption power of the electrical load device 2a consumed when the rpm is Ne is represented by Wload, and the output electric power of the magneto generator 1 in the case where the transformation ratios are 1/3, 1/2, and 1/1 is represented by $W_{1/3}$, $W_{1/2}$, and $W_{1/1}$, respectively.

The voltage control unit 5 controls the respective operating time periods during which the electric power supply is turned on and off (ratio between the turn-on and -off within a predetermined unit control period) so that the following expression may be satisfied, $$W\text{load} \leq Wm1 \times ton\_m1/(ton\_m1 + toff\_m1)$$

where m1 represents the transformation ratio of 1/2; Wm1 ($=W_{1/2}$), the output electric power at the transformation ratio m1; ton_m1, a current supply turn-on period; and toff_m1, a current supply turn-off period.

Through this control, output electric power necessary for at least the consumption power of the electrical load device 2a may be supplied. In addition, compared with the case of the fixed transformation ratio of 1/2 or 1/3, the input torque input to the magneto generator 1 from the torque supplying device RS may be suppressed. As a result, energy necessary for rotating the rotor for power generation may be suppressed to improve power generation efficiency compared with that of the conventional power supply device.

Further, the operation at the transformation ratio m1 (=1/2) is switched to the operation at the transformation ratio m2 (=1/3) to further suppress the input torque in a case where the following expression is satisfied, $$W\text{load} \leq Wm2 \times ton\_m2/(ton\_m2 + toff\_m2)$$

where m2 represents the transformation ratio of 1/3; Wm2 ($=W_{1/3}$), the output electric power at the transformation ratio m2; ton_m2, a current supply turn-on period; and toff_m2, a current supply turn-off period, and in a case where the following expression is satisfied, $$Ton\_m1 \times ton\_m1/(ton\_m1 + toff\_m1) + Toff\_m1 \times toff\_m1/(ton\_m1 + toff\_m1) > Ton\_m2 \times ton\_m2/(ton\_m2 + toff\_m2) + Toff\_m2 \times toff\_m2/(ton\_m2 + toff\_m2)$$

where Ton_m1 (=Ton_1/2) and Ton_m2 (=Ton_1/3) express the input torques input to the rotor 1a from the torque supplying device RS at the transformation ratios m1 and m2 while the electric power supply is turned on, respectively, and where Toff_m1 (=Toff_1/2) and Toff_m2 (=Toff_1/3) express the input torques at the transformation ratios m1 and m2 while the electric power supply is turned off, respectively. Through this switching, energy necessary for rotating the rotor for power generation may be further suppressed to improve power generation efficiency.

Further, the operation at the transformation ratio m1 (=1/2) is switched to the operation at the transformation ratio m2 (=1/3) to suppress the fluctuation in input torque at the switching between when the electric power supply is turned on and off performed by the voltage control unit 5, when the following expression is satisfied.

$$|Ton\_m1 - Toff\_m1| > |Ton\_m2 - Toff\_m2|$$

This switching enables a reduction in load of the torque supplying device RS, and in a case where the torque supplying device is an internal combustion engine, the fluctuation in rotation may be suppressed to improve the drivability.

Note that, in the case of a combination of the transformation ratios m1=1/2 and m2=1/3 as illustrated in FIG. 28, the following expression is satisfied.

$$|Ton\_m1 - Toff\_m1| < |Ton\_m2 - Toff\_m2|$$

Therefore, the fluctuation in input torque is smaller in the case where the operation at the transformation ratio m1 continues without being switched to the operation at the transformation ratio m2.

Further, the operation at the transformation ratio m1 (=1/2) is switched to the operation at the transformation ratio m2 (=1/3) to suppress the fluctuation in output electric power at the switching between when the electric power supply is turned on and off performed by the voltage control unit 5, when the following expression is satisfied.

$$Wm1 > Wm2$$

That is, the fluctuation in current supplied to the electrical load device 2a may be suppressed. As a result, a malfunction due to the voltage fluctuation of the electrical load device 2a may be suppressed, and radio wave noise as a result of the fluctuation in current may be suppressed as well, which enables a malfunction of other electronic devices or the like to be suppressed.

Note that, in the case of the combination of the transformation ratios m1=1/2 and m2=1/3 as illustrated in FIG. 28, the following expression is satisfied.

$$Wm1 < Wm2$$

Therefore, the fluctuation in output electric power is smaller in the case where the operation at the transformation ratio m1 continues without being switched to the operation at the transformation ratio m2.

Note that, in order to realize the above-mentioned operation, similarly to the embodiments described above, the relationship between the rpm (r/min) of the rotor 1a and the output electric power (W) of the magneto generator 1 regarding the transformation ratio and the magneto generator 1, and the relationship among the transformation ratio, the rpm (r/min) of the rotor 1a, and the input torque (Nm) to the magneto generator 1, which are respectively illustrated in FIGS. 17A and 17B, are obtained in advance through measurement or the like, and stored in advance as control information in the memory M of the voltage control unit 5 in the form of a table. When the rpm signal of the rotor and the signal indicating the electrical load state of the electrical load device 2a are input to the voltage control unit 5, the voltage control unit 5 determines the transformation ratio and the on/off switching timing in accordance with the above-mentioned table and processing. Then, based on the determined transformation ratio and the determined on/off switching timing, the voltage control unit 5 performs switch control of the respective thyristors SCR1, SCR2, and SCR3 of the rectifying unit 3a or 3b. For example, the torque while the electric power supply is turned on and off may be estimated based on the rpm and the transformation ratio in accordance with the table, or may be determined by providing a torque meter (not shown) to the torque supplying device RS or the rotary shaft RA and measuring the torque.

Figure 29:
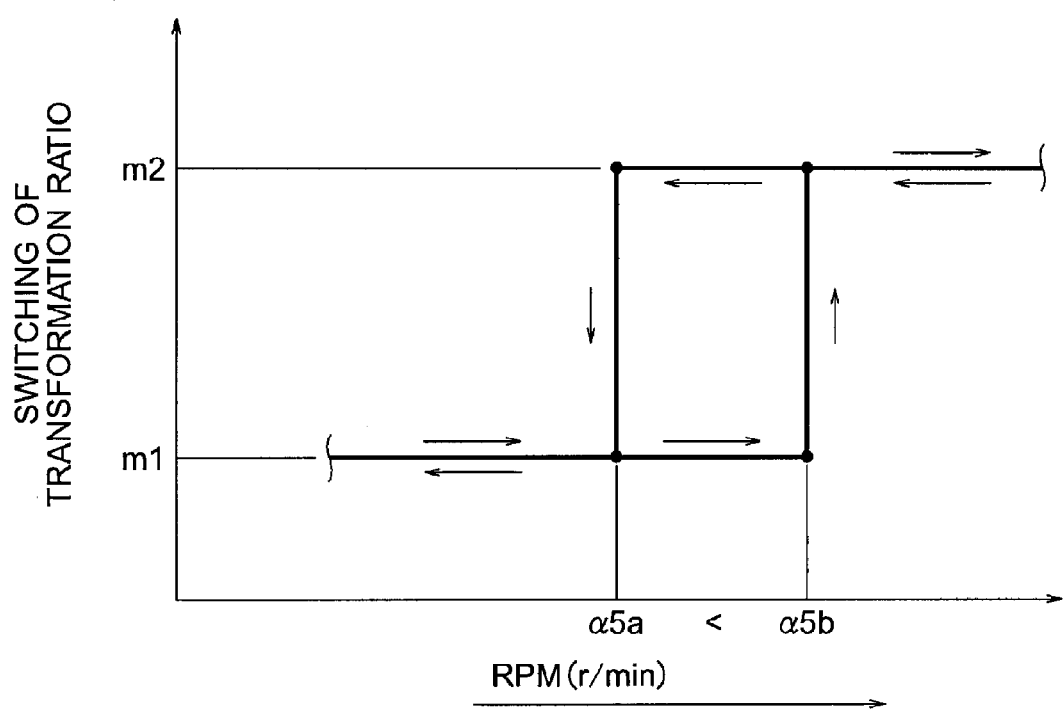
FIG. 29 is a graph illustrating a relationship between the rpm and a timing at which the transformation ratio is switched according to the tenth embodiment of the present invention.

Further, in the case where hysteresis is provided to the above-mentioned timing at which the transformation ratio is switched, the same control as described in the seventh embodiment is added. Through the control, for example, as illustrated in FIG. 29, the hysteresis may be provided to the switching between the operation at the transformation ratio m1 (1/1) and the operation at the transformation ratio m2 (=1/2).

Note that, also in the description of the seventh to tenth embodiments described above, the step-down DC/DC power conversion circuit is used to form the DC voltage transformer, and hence the transformation ratio of the DC voltage transformer is 1/N (N is a natural number), which is equal to or less than 1. However, the DC voltage transformer may be formed of a step-up DC/DC power conversion circuit, and in such a case, a transformation ratio of the DC voltage transformer is N (N is a natural number), which is equal to or larger than 1. The same circuit as illustrated in, for example, FIG. 15 is used as a circuit for forming the DC voltage transformer 40 by the step-up DC/DC power conversion circuit of this case.

Further, in each of the above-mentioned embodiments, the case where the DC voltage transformer 40 has the three transformation ratios of 1/3, 1/2, 1/1 has been described. However, the present invention is not limited thereto, and the type of transformation ratio and the number of types of transformation ratio are not limited to those described in each of the above-mentioned embodiments (two types or four types or more of transformation ratio are also available).

Moreover, the present invention is not limited to the respective embodiments described above and encompasses any possible combination of those embodiments.

What is claimed is:

1. A power supply device, comprising:
   a magneto generator, which includes:
      a rotor including a magnet forming a magnetic field; and
      a stator which generates an alternating current in stator windings by rotation of the rotor;
   a rectifying unit which rectifies the alternating current generated by said magneto generator to a direct current;
   a variable transformation-ratio direct current voltage transformer which transforms an output voltage of the direct current of said rectifying unit to a voltage between input terminals of an electrical load to which electric power is supplied; and
   a voltage control unit which controls a transformation ratio of said variable transformation-ratio direct current voltage transformer in accordance with at least one of an operating state signal regarding the rotation of the rotor of the magneto generator and an electrical load state signal of the electrical load.

2. The power supply device according to claim 1, wherein:
   said variable transformation-ratio direct current voltage transformer is capable of switching the transformation ratio in a plurality of steps of one of N and 1/N, where N is a natural number; and
   said voltage control unit controls the transformation ratio of said variable transformation-ratio direct current voltage transformer in the plurality of steps in accordance with the at least one of the operating state signal and the electrical load state signal, to thereby transform the voltage generated in said variable transformation-ratio direct current voltage transformer to a voltage necessary for the electrical load.

3. The power supply device according to claim 2, wherein:
said variable transformation-ratio direct current voltage transformer includes:
a plurality of capacitors, which are connected in series, for changing the voltage in a stepwise manner;
a plurality of capacitors for energy shift, which are connected in parallel with the plurality of capacitors, for shifting energy among the plurality of capacitors;
an inductor, which is provided in a path in which each of the plurality of capacitors for energy shift is charged and discharged; and
a plurality of switches for switching connections among the plurality of capacitors, the plurality of capacitors for energy shift, and the inductors; and
the plurality of capacitors for energy shift and the inductors form pairs having the same resonance period.

4. The power supply device according to claim 1, wherein:
the operating state signal includes an rpm signal of the rotor; and
said voltage control unit controls the transformation ratio of said variable transformation-ratio direct current voltage transformer in accordance with the rpm signal so that power generation efficiency of said magneto generator is improved.

5. The power supply device according to claim 4, wherein:
the operating state signal further includes a load state signal of a torque supplying device which supplies torque to the rotor; and
said voltage control unit controls, when the load state signal indicates a high load state, the transformation ratio of said variable transformation-ratio direct current voltage transformer in accordance with the rpm signal so that the input torque to the rotor becomes small.

6. The power supply device according to claim 1, wherein:
the operating state signal includes an rpm signal of the rotor;
the electrical load state signal includes a consumption power signal of the electrical load; and
said voltage control unit controls the transformation ratio of said variable transformation-ratio direct current voltage transformer in accordance with the rpm signal so that consumption power indicated by the consumption power signal is supplied and input torque to the rotor becomes small.

7. The power supply device according to claim 4, further comprising output control means for performing one of opening and short-circuiting on an output of said magneto generator to control the voltage between the input terminals of the electrical load, in accordance with a comparison between the voltage between the input terminals of the electrical load and a predetermined value.

8. The power supply device according to claim 5, wherein said voltage control unit controls, when the load state signal indicates a low load state, said transformation ratio of said variable transformation-ratio direct current voltage transformer so that a maximum amount of current is supplied to the electrical load.

9. The power supply device according to claim 1, wherein:
the operating state signal includes an rpm signal of the rotor;
the electrical load state signal includes a consumption power signal of the electrical load; and
said voltage control unit is configured to:
store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer;
periodically perform, in accordance with the rpm signal, voltage control to switch the transformation ratio between two transformation ratios of a plurality of the transformation ratios for each of predetermined successive unit control periods so that consumption power indicated by the consumption power signal is supplied;
control operating time periods $tm1$ and $tm2$ at the transformation ratios of $m1$ and $m2$, respectively, so that the current supply time period $tm1$ at the transformation ratio of $m1$ and the current supply time period $tm2$ at the transformation ratio of $m2$ satisfy the following expression, $$Wload \leq Wm1 \times tm1/(tm1+tm2) + Wm2 \times tm2/(tm1+tm2)$$

where $Wm1$ represents electric power supplied to the electrical load at the transformation ratio of $m1$, $Wm2$ represents electric power supplied to the electrical load at the transformation ratio of $m2$, $Wload$ represents the consumption power of the electrical load, and $(tm1+tm2)$ expresses the unit control period; and
switch an operation at the transformation ratios of $m1$ and $m2$ to an operation at the transformation ratios of $m3$ and $m4$ in a case where the following expression is satisfied, $$Wload \leq Wm3 \times tm3/(tm3+tm4) + Wm4 \times tm4/(tm3+tm4)$$

where $Wm3$ and $tm3$ represent electric power supplied to the electrical load and a current supply time period at the transformation ratio of $m3$, respectively, $Wm4$ and $tm4$ represent electric power supplied to the electrical load and a current supply time period at the transformation ratio of $m4$, respectively, and $(tm3+tm4)$ expresses the unit control period, and in a case where the following expression is satisfied, $$Tm1 \times tm1/(tm1+tm2) + Tm2 \times tm2/(tm1+tm2) > Tm3 \times tm3/(tm3+tm4) + Tm4 \times tm4/(tm3+tm4)$$

where $Tm1$, $Tm2$, $Tm3$, and $Tm4$ represent the input torque to the rotor from a torque supplying device at the transformation ratios of $m1$, $m2$, $m3$, and $m4$, respectively.

10. The power supply device according to claim 1, wherein:
the operating state signal includes an rpm signal of the rotor;
the electrical load state signal includes a consumption power signal of the electrical load; and
said voltage control unit is configured to:
store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer;
periodically perform, in accordance with the rpm signal, voltage control to switch the transformation ratio between two transformation ratios of a plurality of the transformation ratios for each of predetermined successive unit control periods so that consumption power indicated by the consumption power signal is supplied;

control operating time periods tm1 and tm2 at the transformation ratios of m1 and m2, respectively, so that the current supply time period tm1 at the transformation ratio of m1 and the current supply time period tm2 at the transformation ratio of m2 satisfy the following expression, $$Wload \leq Wm1 \times tm1/(tm1+tm2) + Wm2 \times tm2/(tm1+tm2)$$

where Wm1 represents electric power supplied to the electrical load at the transformation ratio of m1, Wm2 represents electric power supplied to the electrical load at the transformation ratio of m2, Wload represents the consumption power of the electrical load, and (tm1+tm2) expresses the unit control period; and switch an operation at the transformation ratios of m1 and m2 to an operation at the transformation ratios of m3 and m4 in a case where the following expression is satisfied, $$Wload \leq Wm3 \times tm3/(tm3+tm4) + Wm4 \times tm4/(tm3+tm4)$$

where Wm3 and tm3 represent electric power supplied to the electrical load and a current supply time period at the transformation ratio of m3, respectively, Wm4 and tm4 represent electric power supplied to the electrical load and a current supply time period at the transformation ratio of m4, respectively, and (tm3+tm4) expresses the unit control period, and in a case where the following expression is satisfied, $$|Tm1-Tm2|>|Tm3-Tm4|$$

where Tm1, Tm2, Tm3, and Tm4 represent the input torque to the rotor from a torque supplying device at the transformation ratios of m1, m2, m3, and m4, respectively.

11. The power supply device according to claim 1, wherein:

the operating state signal includes an rpm signal of the rotor;

the electrical load state signal includes a consumption power signal of the electrical load; and said voltage control unit is configured to:

store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer;

periodically perform, in accordance with the rpm signal, voltage control to switch the transformation ratio between two transformation ratios of a plurality of the transformation ratios for each of predetermined successive unit control periods so that consumption power indicated by the consumption power signal is supplied;

control operating time periods tm1 and tm2 at the transformation ratios of m1 and m2, respectively, so that the current supply time period tm1 at the transformation ratio of m1 and the current supply time period tm2 at the transformation ratio of m2 satisfy the following expression, $$Wload \leq Wm1 \times tm1/(tm1+tm2) + Wm2 \times tm2/(tm1+tm2)$$

where Wm1 represents electric power supplied to the electrical load at the transformation ratio of m1, Wm2 represents electric power supplied to the electrical load at the transformation ratio of m2, Wload represents the consumption power of the electrical load, and (tm1+tm2) expresses the unit control period; and switch an operation at the transformation ratios of m1 and m2 to an operation at the transformation ratios of m3 and m4 in a case where the following expression is satisfied, $$Wload \leq Wm3 \times tm3/(tm3+tm4) + Wm4 \times tm4/(tm3+tm4)$$

where Wm3 and tm3 represent electric power supplied to the electrical load and a current supply time period at the transformation ratio of m3, respectively, Wm4 and tm4 represent electric power supplied to the electrical load and a current supply time period at the transformation ratio of m4, respectively, and (tm3+tm4) expresses the unit control period, and in a case where the following expression is satisfied, $$|Wm1-Wm2|>|Wm3-Wm4|.$$

12. The power supply device according to claim 1, further comprising opening/short-circuiting means for performing one of opening and short-circuiting on an output of said magneto generator to control the voltage between the input terminals of the electrical load, wherein:

the operating state signal includes an rpm signal of the rotor;

the electrical load state signal includes a consumption power signal of the electrical load;

said voltage control unit is configured to:

store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer; and control, in accordance with the rpm signal, in order that consumption power indicated by the consumption power signal is supplied, the transformation ratio to one of a plurality of the transformation ratios for each of predetermined successive unit control periods, and perform current supply on/off control on said opening/short-circuiting means, to thereby control an amount of the electric power supplied to the electrical load;

said opening/short-circuiting means controls operating time periods ton_m1 and toff_m1 during which electric power supply is turned on and off, respectively, so that the current supply turn-on period ton_m1 and the current supply turn-off period toff_m1 at the transformation ratio of m1 satisfy the following expression, $$Wload \leq Wm1 \times ton\_m1/(ton\_m1+toff\_m1)$$

where Wm1 represents electric power supplied to the electrical load at the transformation ratio of m1; and said voltage control unit switches an operation at the transformation ratio of m1 to an operation at the transformation ratio of m2 in a case where the following expression is satisfied, $$Wload \leq Wm2 \times ton\_m2/(ton\_m2+toff\_m2)$$

where Wm2, ton_m2, and toff_m2 represent electric power supplied to the electrical load, a current supply turn-on period, and a current supply turn-off period at the transformation ratio of m2, respectively, and in a case where the following expression is satisfied, $$Ton\_m1 \times ton\_m1/(ton\_m1+toff\_m1)+Toff\_m1 \times toff\_m1/(ton\_m1+toff\_m1)>Ton\_m2 \times ton\_m2/(ton\_m2+toff\_m2)+Toff\_m2 \times toff\_m2/(ton\_m2+toff\_m2)$$

where Ton_m1 and Ton_m2 represent the input torque to the rotor from a torque supplying device at the transformation ratios of m1 and m2 when the electric power supply is turned on, respectively, and Toff_m1 and Toff_m2 represent the input torque at the transformation ratios of m1 and m2 when the electric power supply is turned off, respectively.

13. The power supply device according to claim 1, further comprising opening/short-circuiting means for performing one of opening and short-circuiting on an output of said magneto generator to control the voltage between the input terminals of the electrical load, wherein:
the operating state signal includes an rpm signal of the rotor;
the electrical load state signal includes a consumption power signal of the electrical load;
said voltage control unit is configured to:
store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer; and
control, in accordance with the rpm signal, in order that consumption power indicated by the consumption power signal is supplied, the transformation ratio to one of a plurality of the transformation ratios for each of predetermined successive unit control periods, and perform current supply on/off control on said opening/short-circuiting means, to thereby control an amount of the electric power supplied to the electrical load;
said opening/short-circuiting means controls respective operating time periods ton_m1 and toff_m1 during which electric power supply is turned on and off so that the current supply turn-on period ton_m1 and the current supply turn-off period toff_m1 at the transformation ratio of m1 satisfy the following expression, $$Wload \leq Wm1 \times ton\_m1/(ton\_m1 + toff\_m1)$$

where Wm1 represents electric power supplied to the electrical load at the transformation ratio of m1; and
said voltage control unit switches an operation at the transformation ratio of m1 to an operation at the transformation ratio of m2 in a case where the following expression is satisfied, $$Wload \leq Wm2 \times ton\_m2/(ton\_m2 + toff\_m2)$$

where Wm2, ton_m2, and toff_m2 represent electric power supplied to the electrical load, a current supply turn-on period, and a current supply turn-off period at the transformation ratio of m2, respectively, and in a case where the following expression is satisfied, $$|Ton\_m1 - Toff\_m1| > |Ton\_m2 - Toff\_m2|$$

where Ton_m1 and Ton_m2 represent the input torque to the rotor from a torque supplying device at the transformation ratios of m1 and m2 when the electric power supply is turned on, respectively, and Toff_m1 and Toff_m2 represent the input torque at the transformation ratios of m1 and m2 when the electric power supply is turned off, respectively.

14. The power supply device according to claim 1, further comprising opening/short-circuiting means for performing one of opening and short-circuiting on an output of said magneto generator to control the voltage between the input terminals of the electrical load, wherein:
the operating state signal includes an rpm signal of the rotor;
the electrical load state signal includes a consumption power signal of the electrical load;
said voltage control unit is configured to:
store information indicating a relationship among rpm of the rotor, output power of said variable transformation-ratio direct current voltage transformer, and the transformation ratio of said variable transformation-ratio direct current voltage transformer, and a relationship among the rpm of the rotor, input torque to the rotor, and the transformation ratio of said variable transformation-ratio direct current voltage transformer; and
control, in accordance with the rpm signal, in order that consumption power indicated by the consumption power signal is supplied, the transformation ratio to one of a plurality of the transformation ratios for each of predetermined successive unit control periods, and perform current supply on/off control on said opening/short-circuiting means, to thereby control an amount of the electric power supplied to the electrical load;
said opening/short-circuiting means controls operating time periods ton_m1 and toff_m1 during which electric power supply is turned on and off, respectively, so that the current supply turn-on period ton_m1 and the current supply turn-off period toff_m1 at the transformation ratio of m1 satisfy the following expression, $$Wload \leq Wm1 \times ton\_m1/(ton\_m1 + toff\_m1)$$

where Wm1 represents electric power supplied to the electrical load at the transformation ratio of m1; and
said voltage control unit switches an operation at the transformation ratio of m1 to an operation at the transformation ratio of m2 in a case where the following expression is satisfied, $$Wload \leq Wm2 \times ton\_m2/(ton\_m2 + toff\_m2)$$

where Wm2, ton_m2, and toff_m2 represent electric power supplied to the electrical load, a current supply turn-on period, and a current supply turn-off period at the transformation ratio of m2, respectively, and in a case where the following expression is satisfied, $$Wm1 > Wm2.$$

15. The power supply device according to claim 9, wherein said voltage control unit determines, in accordance with the information stored in accordance with the rpm of the rotor, at least one of electric power Wm supplied to the electrical load and the input torque Tm input to the rotor from the torque supplying device in a case where the transformation ratio M of said variable transformation-ratio direct current voltage transformer equals m.

16. The power supply device according to claim 1, wherein said voltage control unit switches the transformation ratio of said variable transformation-ratio direct current voltage transformer at a timing which differs between when rpm is shifted from low to high and when the rpm is shifted from high to low.

17. The power supply device according to claim 5, wherein:
the torque supplying device comprises an internal combustion engine; and the high load state is determined in accordance with one or a combination of signals indicating an internal pressure of an intake pipe, a throttle opening, and a temperature of cooling water of the internal combustion engine.

* * * * *